(12) United States Patent
Roy et al.

(10) Patent No.: US 10,242,714 B2
(45) Date of Patent: *Mar. 26, 2019

(54) INTERFACE FOR APPLICATION-SPECIFIED PLAYBACK OF PANORAMIC VIDEO

(71) Applicant: Microsoft Technology Licensing, LLC, Redmond, WA (US)

(72) Inventors: Dibyajyoti Roy, Seattle, WA (US); Vladislav Alexandrov, Redmond, WA (US); David H. Mebane, Seattle, WA (US); Aaron Oneal, North Bend, WA (US); Matthew Wozniak, Bellevue, WA (US); Bakkama Srinath Reddy, Redmond, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,210

(22) Filed: Dec. 19, 2016

(65) Prior Publication Data
US 2018/0174619 A1     Jun. 21, 2018

(51) Int. Cl.
*H04N 13/00*         (2018.01)
*H04N 21/6587*     (2011.01)
(Continued)

(52) U.S. Cl.
CPC ....... *G11B 27/102* (2013.01); *H04N 5/23238* (2013.01); *H04N 13/00* (2013.01);
(Continued)

(58) Field of Classification Search
CPC ......... H04N 5/23238; H04N 21/44004; H04N 21/440218; H04N 21/47217; H04N 21/816
(Continued)

(56) References Cited

U.S. PATENT DOCUMENTS

| 6,337,683 B1 | 1/2002 | Gilbert et al. |
| 6,999,080 B1 | 2/2006 | Ungar |

(Continued)

FOREIGN PATENT DOCUMENTS

| CN | 106162203 | 7/2016 |
| CN | 105898271 | 8/2016 |

(Continued)

OTHER PUBLICATIONS

"An Intro to FOVAS: Field of View Adaptive Streaming for Virtual Reality", https://www.pixvana.com/intro-to-field-of-view-adaptive-streaming-for-vr/, Retrieved on: Dec. 1, 2016, 12 pages.

(Continued)

*Primary Examiner* — Thai Q Tran
*Assistant Examiner* — Jose M Mesa
(74) *Attorney, Agent, or Firm* — Klarquist Sparkman, LLP

(57) ABSTRACT

Innovations in reconstruction and rendering of panoramic video are described, including the use of a platform rendering engine to provide a screen projection based on a view direction specified for an application through an interface. For example, based at least in part on the view direction specified for the application, at least a section of panoramic video in an input projection is identified. At least some of sample values of the at least a section of the picture of panoramic video in the input projection are mapped to a screen projection. The screen projection is output for display to a buffer for the application. Thus, an application may use panoramic video, including updating a view direction, without itself having to render a screen projection for the panoramic video.

20 Claims, 14 Drawing Sheets

(51) Int. Cl.
- *G11B 27/10* (2006.01)
- *H04N 5/232* (2006.01)
- *H04N 21/81* (2011.01)
- *H04N 21/472* (2011.01)
- *H04N 21/44* (2011.01)
- *H04N 21/4402* (2011.01)
- *H04N 21/218* (2011.01)

(52) U.S. Cl.
CPC . *H04N 21/21805* (2013.01); *H04N 21/44004* (2013.01); *H04N 21/440218* (2013.01); *H04N 21/440245* (2013.01); *H04N 21/47217* (2013.01); *H04N 21/6587* (2013.01); *H04N 21/816* (2013.01)

(58) Field of Classification Search
USPC .......................................................... 386/248
See application file for complete search history.

(56) References Cited

U.S. PATENT DOCUMENTS

| | | | |
|---|---|---|---|
| 7,142,209 | B2 | 11/2006 | Uyttendaele et al. |
| 7,164,448 | B2* | 1/2007 | Iipko ........................ G06T 9/007 348/563 |
| 7,421,129 | B2 | 9/2008 | Lee et al. |
| 8,264,524 | B1 | 9/2012 | Davey |
| 9,264,839 | B2 | 2/2016 | Oishi et al. |
| 9,741,091 | B2 | 8/2017 | Satori et al. |
| 2002/0011997 | A1 | 1/2002 | Sotoda et al. |
| 2006/0023105 | A1 | 2/2006 | Kostrzewski et al. |
| 2006/0125921 | A1 | 6/2006 | Foote |
| 2007/0091855 | A1* | 4/2007 | Karaoguz ............. H04W 88/06 370/338 |
| 2008/0089611 | A1 | 4/2008 | Mcfadyen et al. |
| 2009/0041379 | A1 | 2/2009 | Shih |
| 2010/0299630 | A1* | 11/2010 | McCutchen ............. H04N 7/18 715/803 |
| 2011/0228096 | A1 | 9/2011 | Friel et al. |
| 2012/0092348 | A1 | 4/2012 | Mccutchen |
| 2012/0229595 | A1 | 9/2012 | Miller |
| 2014/0211858 | A1 | 7/2014 | Zhao et al. |
| 2014/0247983 | A1* | 9/2014 | MacInnis ............... H04N 19/14 382/166 |
| 2015/0138311 | A1 | 5/2015 | Towndrow |
| 2016/0006932 | A1 | 1/2016 | Zhang et al. |
| 2016/0006933 | A1 | 1/2016 | Zimmerman et al. |
| 2016/0012855 | A1 | 1/2016 | Krishnan |
| 2016/0112705 | A1 | 4/2016 | Mukherjee |
| 2016/0119551 | A1 | 4/2016 | Brown et al. |
| 2016/0142697 | A1 | 6/2016 | Gewickey et al. |
| 2016/0227190 | A1 | 8/2016 | Cole et al. |
| 2016/0241836 | A1 | 8/2016 | Cole et al. |
| 2016/0261884 | A1 | 9/2016 | Li et al. |
| 2017/0026577 | A1* | 1/2017 | You ........................ G06F 3/167 |
| 2017/0085917 | A1 | 3/2017 | Hannuksela |
| 2017/0295356 | A1 | 10/2017 | Abbas et al. |
| 2018/0018807 | A1* | 1/2018 | Lu ...................... H04N 5/23238 |
| 2018/0152663 | A1 | 5/2018 | Wozniak et al. |
| 2018/0152682 | A1 | 5/2018 | Wozniak et al. |

FOREIGN PATENT DOCUMENTS

| | | |
|---|---|---|
| EP | 3145199 | 3/2017 |
| WO | WO 2005/013001 | 2/2005 |
| WO | WO 2009/047572 | 4/2009 |
| WO | WO 2015/174501 | 11/2015 |
| WO | WO 2015/184416 | 12/2015 |
| WO | WO 2016/024892 | 2/2016 |
| WO | WO 2016/076680 | 5/2016 |

OTHER PUBLICATIONS

"Littlstar—For Developers", http://web.archive.org/web/20160521214133/http:/twinkle.littlstar.com/developers, Published on: May 21, 2016, 5 pages.

Zheng, et al., "Adaptive Selection of Motion Models for Panoramic Video Coding", In Proceedings of IEEE International Conference on Multimedia and Expo, Jul. 2, 2007, pp. 1319-1322.

Budagavi, et al., "360 Degrees Video Coding Using Region Adaptive Smoothing", In Proceedings of IEEE International Conference on Image Processing, Sep. 27, 2015, pp. 750-754.

Lee, et al., "Rich360: Optimized Spherical Representation from Structured Panoramic Camera Arrays", In Journal of ACM Transactions on Graphics, vol. 35, Issue 4, Jul. 2016, 11 pages.

Rutkas, Clint, "Windows 10 SDK Preview Build 14965 Released," https://blogs.windows.com/buildingapps/2016/11/21/windows-10-sdk-preview-build-14965-released/#PUWRfV602DzSVEXq.97, page dated Nov. 21, 2016 (accessed on or before Dec. 19, 2016), 24 pages.

"14917 vs 14926," http://pastebin.com/bL2j4gsE, page dated Sep. 12, 2016 (accessed on or before Dec. 19, 2016), 10 pages.

"International Search Report and Written opinion issued in PCT Application No. PCT/US17/062916", dated Feb. 16, 2018, 11 pages.

"International Search Report and Written opinion issued in PCT Application No. PCT/US2017/062918", dated Feb. 28, 2018, 13 Pages.

"Non Final Office Action Issued in U.S. Appl. No. 15/384,237", dated Jan. 26, 2018, 31 Pages.

"Non Final Office Action Issued in U.S. Appl. No. 15/384,265", dated Jun. 1, 2018, 11 Pages.

"Sony Launches 360 Degree Hemispheric-View Mini Dome IP Camera", In Publication of Sony Electronics, Sep. 2013, 2 pages.

Alface, et al., "Interactive Omnidirectional Video Delivery: A Bandwidth-Effective Approach", In Journal of Science, vol. 16, Issue 4, Mar. 2012, pp. 135-147.

Chen, Shenchang Eric, "QuickTime® VR—An Image-Based Approach to Virtual Environment Navigation", In ACM Annual Conference on Computer Graphics and Interactive Techniques, Sep. 1995, pp. 29-38.

Corbillon, et al., "Viewport-AdaptiveNavigable360-DegreeVideo Delivery", Retrieved From: www.researchgate.net/profile/Gwendal Simon-telecom_sudpariseu/publication/308647414_Viewport-Adaptive Navigable 360-Degree Video Delivery/links/580a787e08ae74852b5304a7/V1ewport-Adaptive-Navigable-360-Degree-Video-Delivery.pdf, Sep. 2016, 7 Pages.

Kopf, Johannes, "360 Video Stabilization: A New Algorithm for Smoother 360 Video Viewing", Retrieved From: https://web.archive.org/web/20161124045648/https://code.facebook.com/posts/697469023742261/360-video-stabilization-a-new-algorithm-for-smoother-360-video-viewing/, Nov. 24, 2016, 8 Pages.

Zhang, Ziyang, "Image-based Rendering a Brief Review & Study Notes", Retrieved From: http://leonzz.mikreal.com/pdf/imagerendering.pdf, Aug. 22, 2013, 41 Pages.

Zhu, et al., "Warping of a Spherical Representation of Image-Based Models on GPU", In Proceedings of International Conference on Virtual Reality Continuum and its Applications in Industry, Dec. 2009, pp. 89-94.

\* cited by examiner software 180 implementing one or more innovations relating to an interface for application-specified playback of panoramic video

FIG. 3a
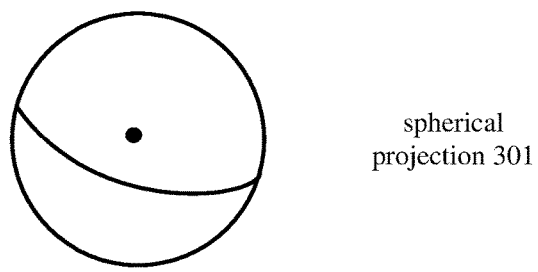
spherical projection 301
FIG. 3b
equirectangular projection 302
FIG. 3c
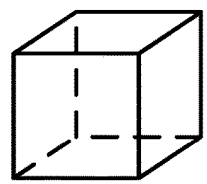 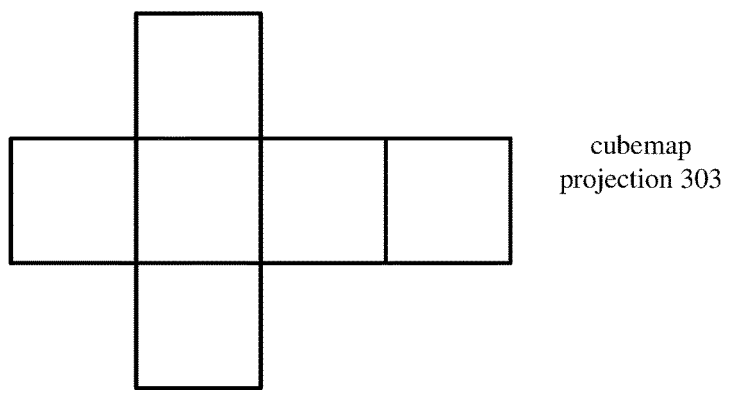
cubemap projection 303 input equirectangular projection 520 with identified section including bounding box 524 around corresponding portion 521 spherical projection 510 with first view section 511 input equirectangular projection 520 with identified section including bounding boxes 525a, 525b around corresponding portions 522a, 522b spherical projection 510 with second view section 512

FIG. 7      700
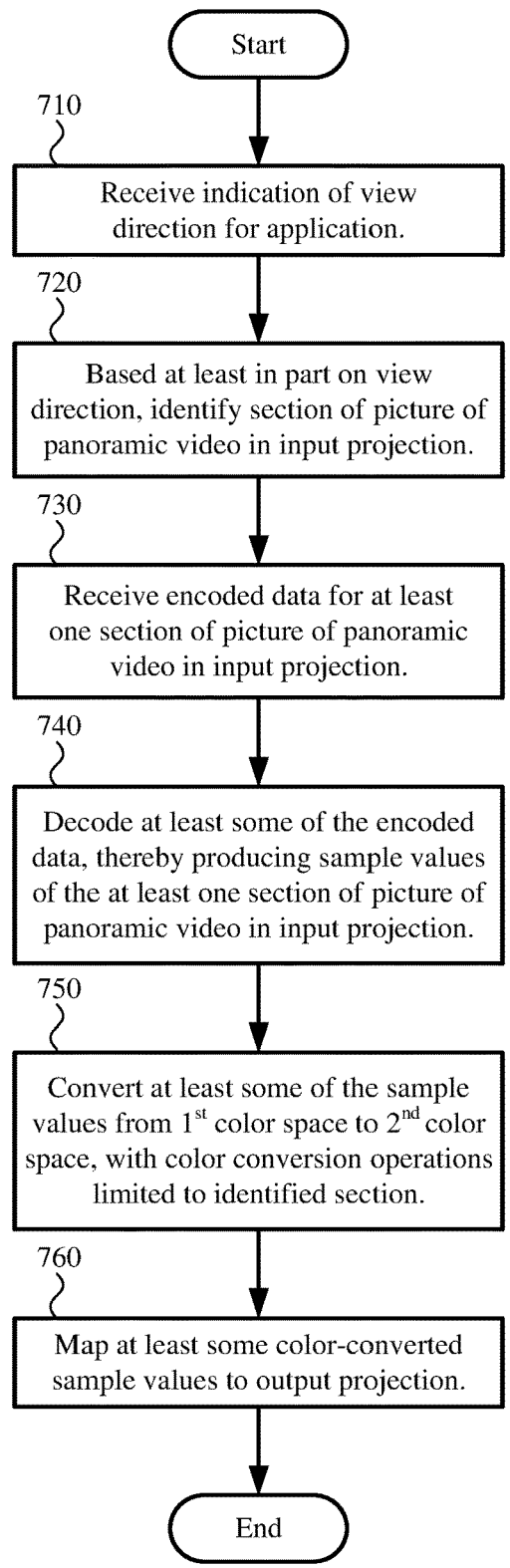

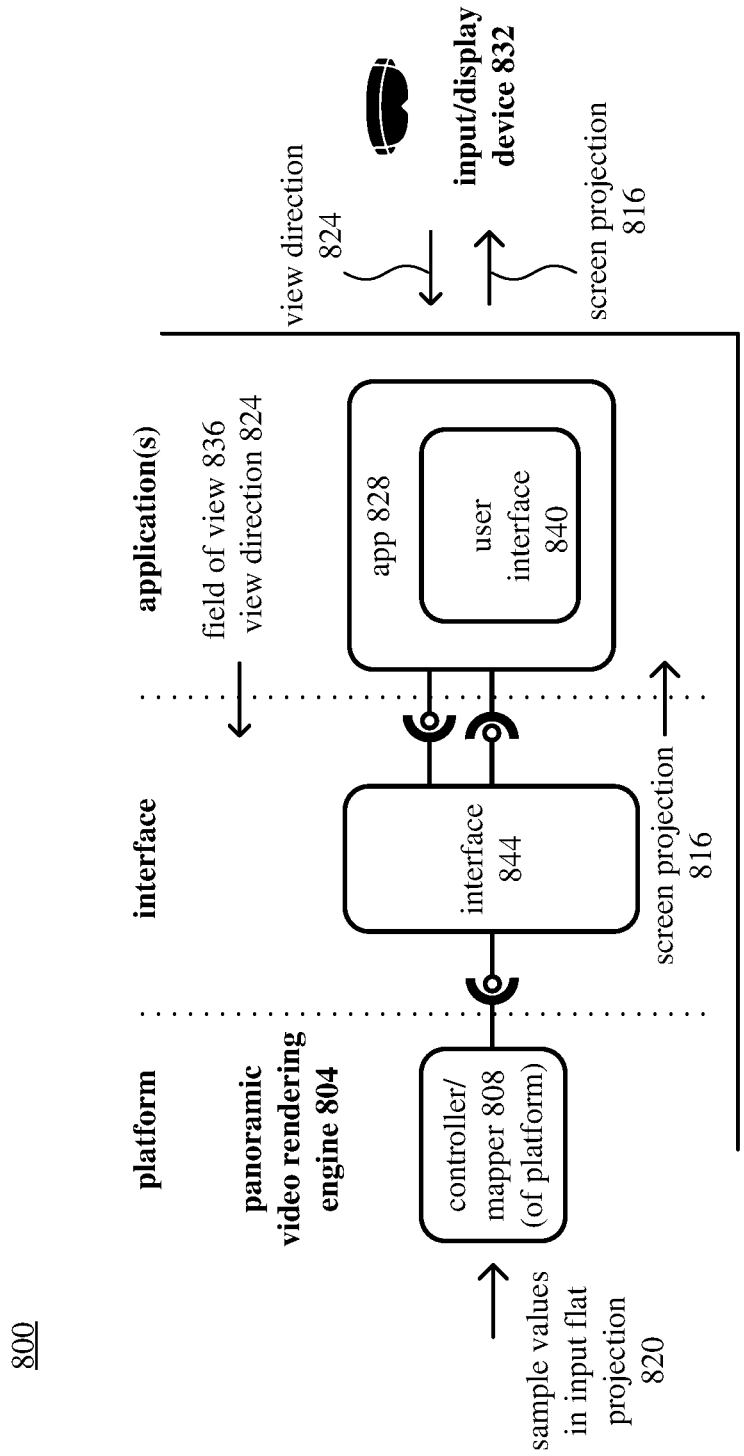

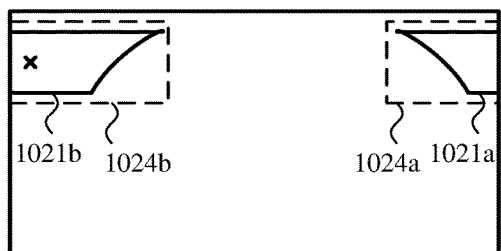
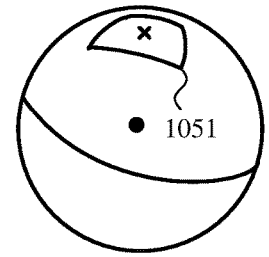

input equirectangular projection 1010 with identified section including bounding boxes 1024a, 1024b around corresponding portions 1021a, 1021b map to spherical spherical projection 1050 with view section 1051 rotate

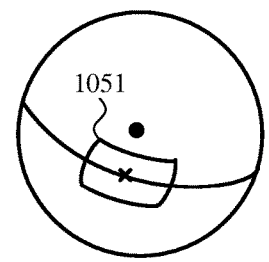

spherical projection 1050 with rotated view section 1051 map to equi-rectangular

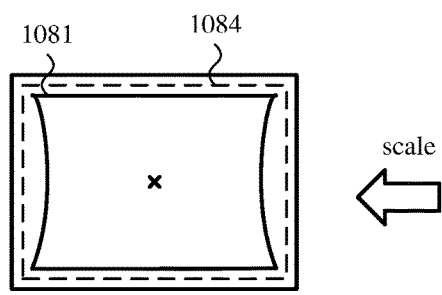
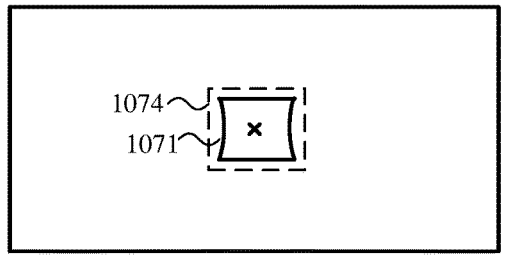

output equirectangular projection 1080 with identified section including bounding box 1084 around scaled corresponding portion 1081 scale intermediate equirectangular projection 1070 with identified section including bounding box 1074 around corresponding portion 1071

FIG. 11a

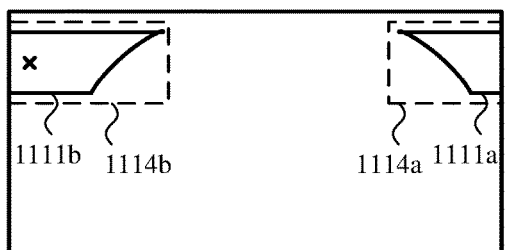
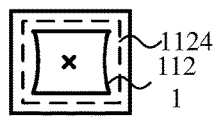

input equirectangular projection 1110 with identified section including bounding boxes 1114a, 1114b around corresponding portions 1111a, 1111b output equirectangular projection 1120 with identified section including bounding box 1124 around corresponding portion 1121

FIG. 11b

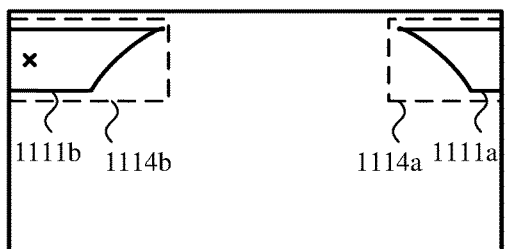
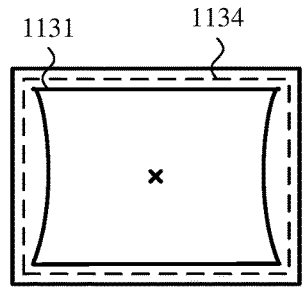

input equirectangular projection 1110 with identified section including bounding boxes 1114a, 1114b around corresponding portions 1111a, 1111b output equirectangular projection 1130 with identified section including bounding box 1134 around scaled corresponding portion 1131

INTERFACE FOR APPLICATION-SPECIFIED PLAYBACK OF PANORAMIC VIDEO

BACKGROUND

When video is streamed over the Internet and played back through a Web browser or media player, the video is delivered in digital form. Digital video is also used when video is delivered through many broadcast services, satellite services, and cable television services. Real-time videoconferencing often uses digital video, and digital video is used during video capture with most smartphones, Web cameras, and other video capture devices. Digital video is also used for technologies such as virtual reality and augmented reality, whether video is played back in a head-mounted display, mobile device, or other type of device.

Panoramic video is video in which views in multiple directions around a central position are recorded at the same time. The recorded video can include image content in every direction, or at least image content in every direction in a 360-degree sphere around the central position, including at least some image content above the central position and at least some image content underneath the central position. Panoramic video is sometimes called 360-degree video, immersive video, or spherical video. Panoramic video can be captured using an omnidirectional camera or a collection of multiple cameras pointing in different directions. For modern-day applications, panoramic video is processed in digital form during stages of creation, editing, and delivery, as well as stages of reconstruction and rendering for playback.

During playback, a viewer typically can control a view direction relative to the central position, potentially changing which section of the panoramic video is viewed over time. In some systems, a viewer can also zoom in or zoom out, which effectively changes the field of view of the panoramic video. When panoramic video is rendered for display, the section of the panoramic video that is viewed may be projected to a flat (or, at least, non-spherical) image, which is called a screen projection. For a mobile device or computer monitor, a single screen projection may be rendered. For a head-mounted display (or mobile device held in a head-mounted band), the section of the panoramic video that is viewed may be projected to two screen projections, for the left and right eyes, respectively.

Typically, screen projections are rendered by an application. For example, the application may receive a flat projection from a video processing engine, map the flat projection to a sphere, and then render a screen projection from the sphere map. Thus, the processing required to render panoramic video can be complex, making software developers less likely to include panoramic video in their applications. Thus, room for improvement remains in the area of panoramic video rendering.

SUMMARY

In summary, the detailed description presents innovations in reconstruction and rendering of panoramic video. In some example implementations, the innovations allow an application to provide panoramic video without the application having to carry out rendering processes to generate screen projections of the panoramic video. For example, an application can specify a view direction and/or a field of view, or specify a source of the view direction and/or field of view. The application can also specify other panoramic video playback parameters. A screen projection buffer for the application (which may be a buffer under control of the application, a buffer at a memory location specified by the application, or a buffer at a memory location specified by a panoramic video rendering engine) receives a screen projection of the panoramic video (corresponding to the view direction or other parameters received for the application) that can be output to a display device. Thus, the disclosed innovations can facilitate the use of panoramic video.

According to one aspect of the innovations described herein, a computer system implements a panoramic video rendering engine that includes an input projection buffer, a controller, and a mapper. The input projection buffer is configured to store at least some sample values of a picture of panoramic video in an input projection. The controller is configured to receive, from an application through an interface, an indication of a view direction for the application or indication of a view direction source. The controller can also be configured to receive, through the interface, an indication of a field of view for the application or indication of field of view source. Based at least in part on the view direction (and possibly also the field of view), the controller identifies a section of the picture of panoramic video in the input projection. The mapper is configured to map at least some of sample values of the section of the picture of panoramic video in the input projection to a screen projection based on the identified section in the input projection. The mapper provides the screen projection to a screen projection buffer for the application.

In some cases, the controller is a view-dependent operation controller, and the computer system can include additional modules, such as a color converter, a video decoder, and a streaming controller. The controller can be configured to limit the operations of the color converter to the identified section. In other words, color conversion operations are performed for sample values in the identified section, but not for sample values outside the identified section. In some example implementations, the view-dependent operation controller also limits operations of the video decoder, so as to selectively decode encoded data for the identified section but not other sections of the picture of panoramic video in the input projection. In still other example implementations, the view-dependent operation controller further limits operations of the streaming controller, so that the streaming controller requests encoded data for the identified section but not other sections of the picture of panoramic video in the input projection. In this way, the panoramic video rendering engine can avoid performing operations to reconstruct sections of the picture of panoramic video that will not be viewed.

According to another aspect of the innovations described herein, a computer system implements a panoramic video platform rendering method. The method includes sending, through an interface, an indication of a view direction for an application or indication of a view direction source to a panoramic video rendering engine that implements platform rendering services. From the panoramic video rendering engine that implements platform rendering services, a screen projection of locations of a picture of panoramic video in an input projection is received at a buffer (screen projection buffer) for the application. The locations correspond to the view direction.

According to a further aspect of the innovations described herein, a computer system implements a method that includes receiving, through an interface, an indication of a view direction for an application or indication of a view direction source. Based at least in part on the view direction, a section of a picture of panoramic video is identified in an input projection. At least some of sample values of the picture of panoramic video in the input projection are mapped to a screen projection. The screen projection is output for display to a buffer (screen projection buffer) for the application.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIGS. 3a to 3c are diagrams of example projections for a picture of panoramic video.

FIG. 7 is a flowchart illustrating a generalized technique for playback of panoramic video with view-dependent operations.

FIG. 8 is a diagram illustrating features of an example architecture for a panoramic video playback system that includes a panoramic video rendering engine operating in platform rendering mode, an interface, and an application.

FIG. 10 is a diagram illustrating concepts of re-projection of sample values of an input flat projection to an output flat projection for a picture of panoramic video in application rendering mode.

FIGS. 11a and 11b are diagrams illustrating examples of re-projection of sample values of an input flat projection to an output flat projection for a picture of panoramic video in application rendering mode.

DETAILED DESCRIPTION

The detailed description presents innovations in reconstruction and rendering of panoramic video. In some example implementations, the innovations help a panoramic video playback system avoid spending resources such as memory and processing cycles to reconstruct image content that is not viewed. Alternatively, the innovations help a panoramic video playback system devote available resources to improving the quality of image content that is rendered. The innovations include use of view-dependent operations such as color conversion operations and decoding operations during playback of panoramic video. The innovations also include, for an application rendering mode, re-projection between flat projections of pictures of panoramic video, to make later rendering by an application more efficient. The innovations further include, for a platform rendering mode, ways for an application to provide panoramic video without the application having to carry out rendering processes to generate screen projections of the panoramic video.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

Figure 1:
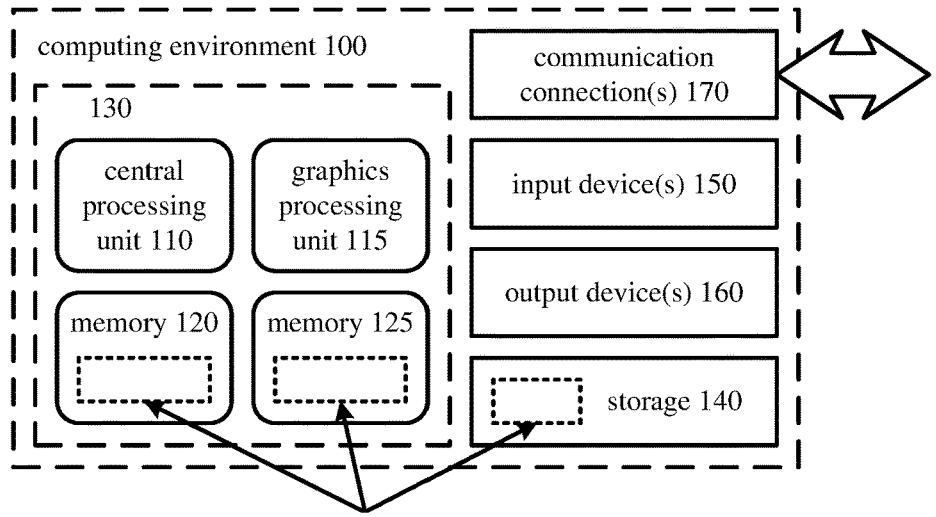
FIG. 1 is a diagram illustrating an example computer system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG.

1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations relating to an interface for application-specified playback of panoramic video, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations relating to an interface for application-specified playback of panoramic video.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a head-mounted display, computer monitor, other display device, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine," "select," and "receive" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
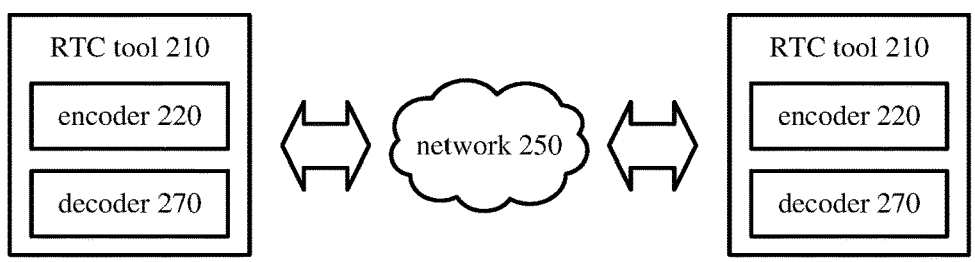
FIGS. 2a and 2b are diagrams illustrating example network environments in which some described embodiments can be implemented.
Figure 2B:
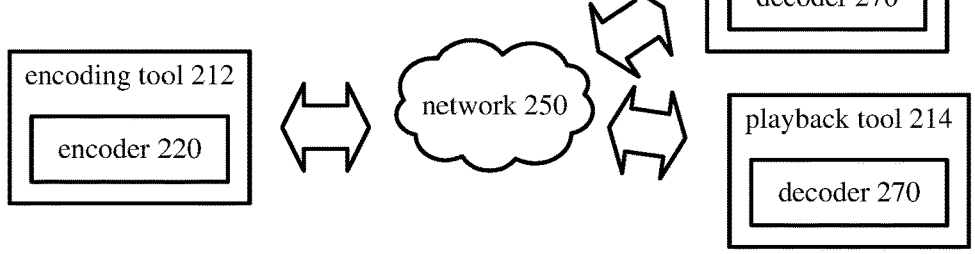

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, ISO/IEC 14496-10 standard (also known as H.264/AVC), another standard, or a proprietary format such as VP8 or VP9, or a variation or extension thereof, with a corresponding decoder (270) accepting and decoding encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 6:
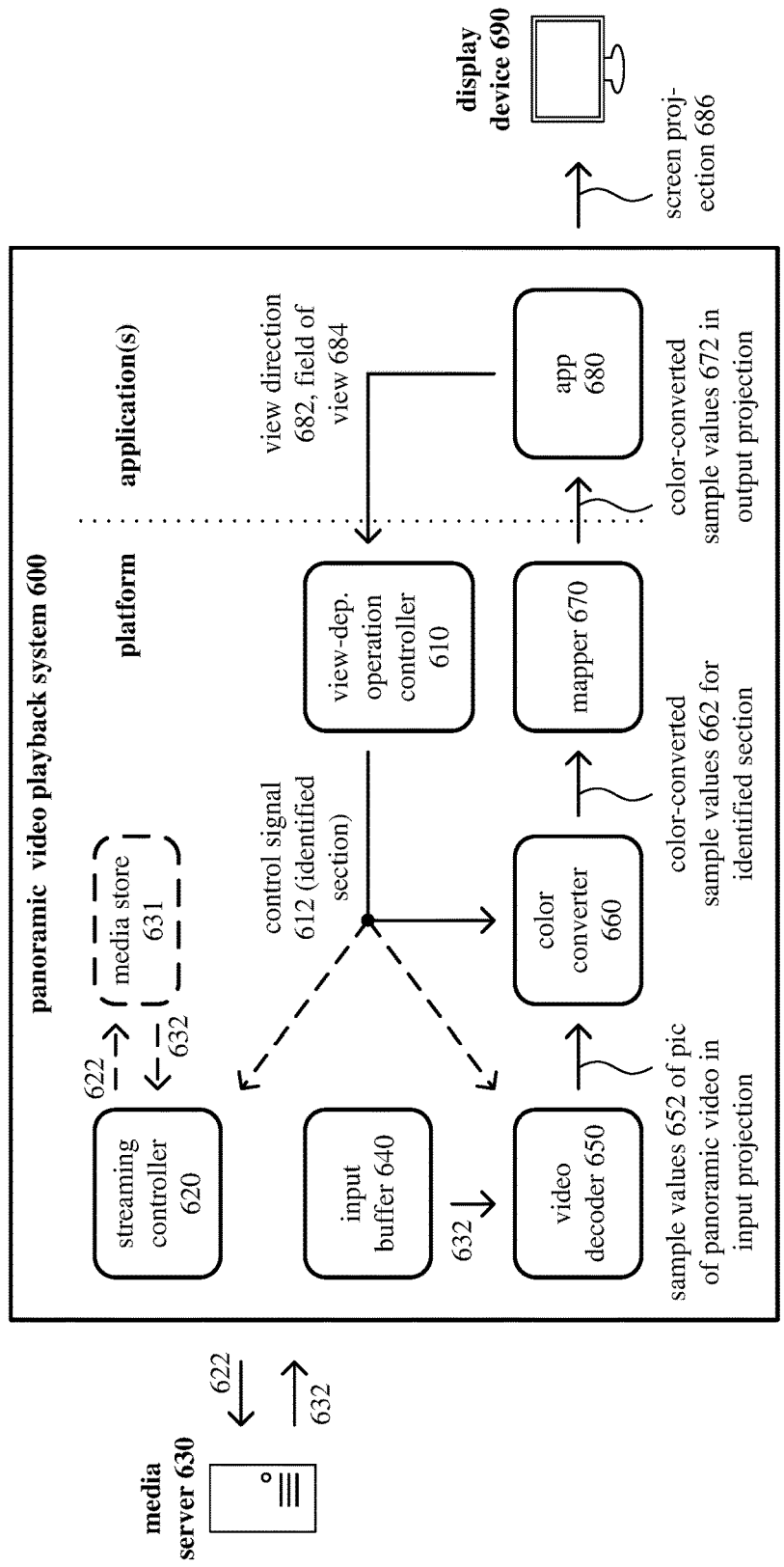
FIG. 6 is a diagram illustrating an example architecture for a panoramic video playback system that supports view-dependent operations and re-projection operations for flat projections.

An RTC tool (210) manages encoding by an encoder (220) and also manages decoding by a decoder (270). FIGS. 6 and 10 show example video playback systems (600, 1000) that can be included in the RTC tool (210). Alternatively, the RTC tool (210) uses another video playback system.

In the network environment (202) shown in FIG. 2b, an encoding tool (212) includes an encoder (220) that encodes video for delivery to multiple playback tools (214), which include decoders (270). The unidirectional communication can be provided for live broadcast video streaming, a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). A playback tool (214) can include client-side controller logic for managing connections with the encoding tool (212). FIGS. 6 and 10 show example video playback systems (600, 1000) that can be included in the playback tool (214). Alternatively, the playback tool (214) uses another video playback system.

Alternatively, a Web server or other media server can store encoded video for delivery to one or more playback tools (214), which include decoders (270). The encoded video can be provided, for example, for on-demand video streaming, broadcast, or another scenario in which encoded video is sent from one location to one or more other locations. A playback tool (214) can communicate with the media server to determine a stream of video for the playback tool (214) to receive. The media server can include server-side controller logic for managing connections with one or more playback tools (214). A playback tool (214) receives the stream, buffers the received encoded data for an appropriate period, and begins decoding and playback.

III. Example Projections for a Picture of Panoramic Video.

Panoramic video (sometimes called 360-degree video, immersive video, or spherical video) is video in which views in multiple directions around a central position are recorded at the same time. A picture of panoramic video is a representation of the views in multiple directions recorded at a given time. The picture of panoramic video can include image content in every direction or substantially every direction from the central position. More commonly, a picture of panoramic video includes image content in every direction in a 360-degree sphere around the central position, including at least some image content above the central position and at least some image content underneath the central view/camera position.

A picture of panoramic video includes sample values, which represent colors at locations of the picture. Depending on how the picture is projected, sample values of the picture can have various attributes. In general, sample values can have 8 bits per sample value, 10 bits per sample value, 12 bits per sample value, or some other number of bits per sample value. The dynamic range of sample values can be standard dynamic range (e.g., 0 to 100 nits), high dynamic range (e.g., 0 nits to 1000 nits, 0 nits to 1500 nits, 0 nits to 4000 nits), or some other dynamic range. With respect to color gamut, the sample values can have a narrow color gamut (common for standard dynamic range video) or a wider color gamut (common for high dynamic range video), which can potentially represent colors that are more saturated, or vivid. For a rectilinear projection, the spatial resolution of a picture of panoramic video can be 2160×1080 sample values, 4320×2160 sample values, 7680×3840 sample values, 8640×4320 sample values, or some other number of sample values per picture. Often, the spatial resolution of a picture of panoramic video is very high (e.g., 8K or higher), so as to provide sufficient spatial resolution when a smaller view within the picture is rendered. In general, a pixel is the set of one or more collocated sample values for a location in a picture, which may be arranged in different ways for different chroma sampling formats. For a spherical projection, spatial resolution can vary.

Typically, before encoding in a rectilinear projection (e.g., an equirectangular projection), sample values of a picture are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). After decoding, sample values in a rectilinear projection may be converted to another color space, such as an RGB color space. Sample values in a spherical projection or screen projection for a picture of panoramic video may be in an RGB color space or other color space.

The image content for a picture of panoramic video can be organized in various ways. FIG. 3a shows a spherical projection (301) for a picture of panoramic video. In the spherical projection (301), sample values are mapped to locations equally distant from a central view/camera position. Sample values may be in an RGB color space or other color space close to the final color space for rendering. The spherical projection (301) provides a conceptually simple way to represent the sample values of the picture of panoramic video, and may be useful for some modeling and rendering operations. For other stages of processing (e.g., storage, compression, decompression), the spherical projection (301) may not be as efficient as other types of projections.

FIG. 3b shows an equirectangular projection (302) for a picture of panoramic video. The equirectangular projection (302) is a useful representation for storing, compressing, and decompressing sample values of the picture of panoramic video. In particular, sample values of the equirectangular projection (302) can be processed with conventional video coding/decoding tools, which process blocks of sample values in rectangular pictures. The equirectangular projection (302) depicts image content in 360 degrees, rotating sideways from a central view/camera position, along the horizontal axis; it depicts image content in 180 degrees, rotating up or down from a central view/camera position, along the vertical axis. In the equirectangular projection (302), content towards the top of the picture and content towards the bottom of the picture is stretched horizontally, and content midway between the top and bottom is squeezed horizontally. In addition to causing visible distortion (which is not a problem to the extent the equirectangular projection (302) is not directly rendered for display), the equirectangular projection (302) uses extra sample values to represent the content towards the top of the picture and content towards the bottom of the picture. Metadata associated with the equirectangular projection (302) can indicate resolution of the equirectangular projection (302) as well as a view direction at each of one or more locations of the equirectangular projection (302) (e.g., view direction at the center of the equirectangular projection (302), view direction at the midpoint of the vertical axis along an edge of the equirectangular projection (302)). Or, a default view direction for a location of the equirectangular projection (302) can be defined. For example, the center of the equirectangular projection (302) is defined to be the view direction with pan of zero degrees and pitch of zero degrees.

FIG. 3c shows a cubemap projection (303) for a picture of panoramic video. Like the equirectangular projection (302), the cubemap projection (303) is a useful representation for storing, compressing, and decompressing sample values of the picture of panoramic video, because the faces of the cubemap projection (303) can be "unfolded" and/or split into separate sections for such operations. In the cubemap projection (303), content towards the edges of faces of a cube is stretched horizontally and/or vertically, and content towards the middle of faces is squeezed horizontally and/or vertically. In general, the extent of such stretching is less than at the top and bottom of the equirectangular projection (302), and the cubemap projection (303) may use fewer extra sample values to represent stretched content. Metadata associated with the cubemap projection (303) can indicate resolution of the cubemap projection (303) as well as a view direction at each of one or more locations of the cubemap projection (303).

During playback, pictures of panoramic video are reconstructed. At least conceptually, a picture may be represented in spherical projection at this stage. Typically, a viewer can control a view direction relative to the central view/camera position for the spherical projection, potentially changing which section of the panoramic video is viewed. For example, in addition to specifying heading in degrees or radians from side to side (i.e., yaw, or pan) for a view direction, the viewer can specify an inclination in degrees or radians up or down (i.e., pitch, or tilt) for the view direction and even a rotation in degrees or radians of the view (i.e., roll) for the view direction. Alternatively, the view direction can be parameterized in some other way (e.g., as a matrix of affine transform coefficients that specify a spatial rotation in three dimensions using Euler angles or quaternion units, corresponding to heading, pitch, and roll values). The viewer may also be able to zoom in or zoom out, which effectively changes the field of view of the panoramic video as rendered. The field of view can be specified in degrees (e.g., 90 degrees for normal view, 120 degrees for wide view) or radians. When a view of panoramic video is rendered for display, the section of the panoramic video that is viewed may be projected to a flat image, which is called a screen projection.

Figure 4:
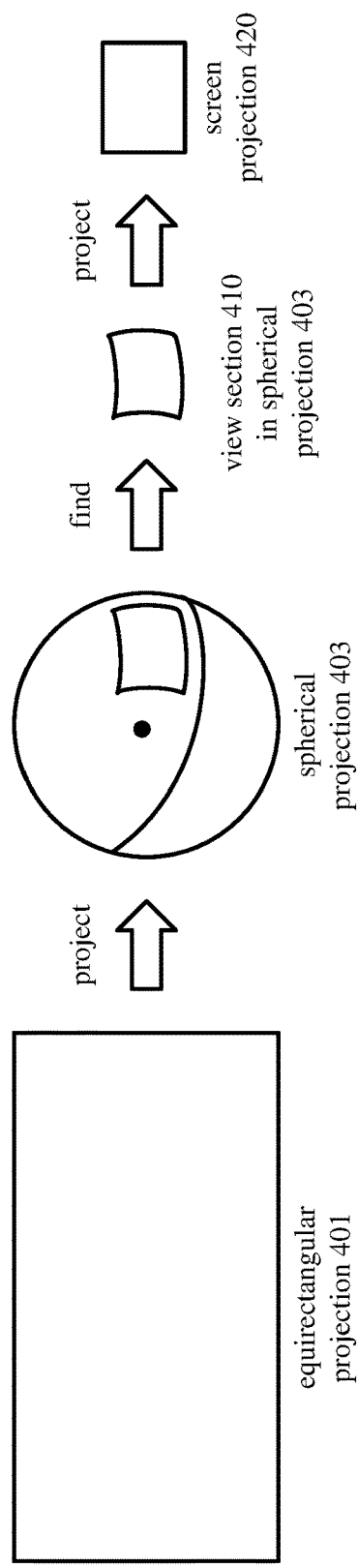
FIG. 4 is a diagram illustrating an example of a screen projection for a view of a picture of panoramic video.

FIG. 4 shows an example of screen projection for a view of a picture of panoramic video. An equirectangular projection (401) of the picture is reconstructed, e.g., through video decoding operations and color conversion operations. The sample values of the picture of panoramic video are mapped to the spherical projection (403). In essence, the sample values are projected to the "inside" of the sphere for the spherical projection (403), as viewed from the perspective of a view/camera position at the center of the sphere. Locations in the spherical projection (403) are mapped to corresponding locations in the equirectangular projection (401). If a corresponding location in the equirectangular projection (401) is at or near an integer (whole pixel) offset, the sample value from the corresponding location is assigned to the location in the spherical projection (403). Otherwise, a sample value can be calculated by interpolation between sample values at nearby locations in the equirectangular projection (401) (e.g., using bilinear interpolation), and the (interpolated) sample value is assigned to the location in the spherical projection (403).

A view section (410) in the spherical projection (403) is found, based on a view direction and field of view from the central view/camera position. The view section (410) is projected to a screen projection (420) for rendering. For example, a perspective transform is applied to assign sample values to the respective locations of the screen projection (420) from the sample values of the spherical projection (403). For every location of the screen projection (420), a sample value is assigned directly from the spherical projection (403) or from interpolation between sample values of the spherical projection (403). Thus, the screen projection (420) includes sample values from the spherical projection (403) and, by extension, sample values from relevant parts of the equirectangular projection (401).

IV. Examples of Identifying Sections in Input Projections.

When an application provides a view direction and field of view (if not pre-defined) for rendering a view of a picture of panoramic video, the application specifies a view section to be rendered. For example, an application provides an indication of a view direction (and possibly an indication of a field of view) to a module of a panoramic video playback system. The view direction can be specified as (1) a heading in degrees or radians from side to side (i.e., yaw, or pan) from a central view/camera position and (2) an inclination in degrees or radians up or down (i.e., pitch, or tilt) from the view/camera position. The view direction can also include (3) a rotation in degrees or radians of the view (i.e., roll) from the view/camera position. Or, the view direction can be parameterized in some other way (e.g., a matrix of affine transform coefficients that specify a spatial rotation). The field of view can be specified in degrees (e.g., 90 degrees for normal view, 120 degrees for wide view) or radians. Alternatively, instead of directly providing indications of view direction (and possibly field of view), an application can specify a source for indications of view direction (and possibly field of view), in which case the specified source provides the indications during rendering. In any case, the module of the panoramic video playback system finds the appropriate view section for a spherical projection of the picture of panoramic video.

The view section typically includes a small proportion of the overall content of the picture of panoramic video. To simplify processing and save resources during operations such as decoding and color conversion, the panoramic video playback system can identify the section of the picture, in an input projection, that corresponds to the view section, then use that information to limit which operations are performed when reconstructing the input projection for the picture of panoramic video. In particular, the panoramic video playback system can limit operations to the identified section in the input projection (and possibly neighboring areas around the identified section in the input projection).

Figure 5A:
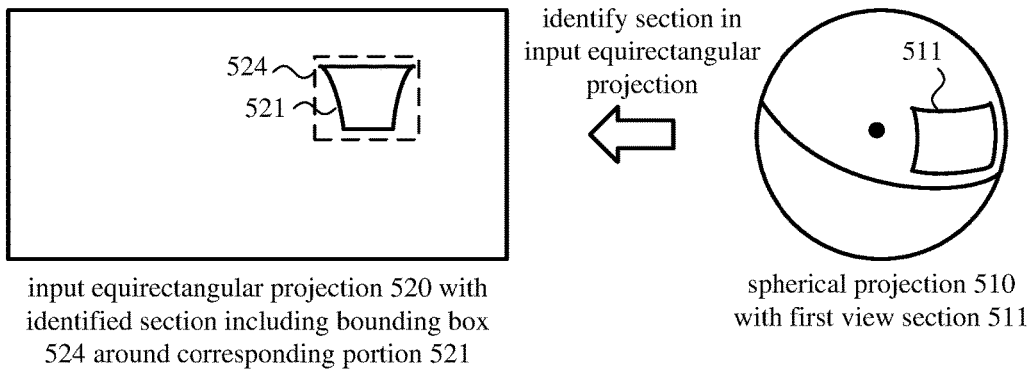
FIGS. 5a and 5b are diagrams illustrating examples of identification of sections of an input equirectangular projection that correspond to view sections of a spherical projection for a picture of panoramic video.

FIG. 5a shows an example of identification of a section of an input equirectangular projection (520) that corresponds to a first view section (511) of a spherical projection (510) for a picture of panoramic video. The panoramic video playback system finds the first view section (511) of the spherical projection (510) based on a view direction and field of view. Based on the first view section (511), the panoramic video playback system identifies a section in the input equirectangular projection (520). Specifically, the panoramic video playback system identifies a portion (521) of the picture in the equirectangular projection (520) that corresponds to the first view section (511) of the spherical projection (510). Depending on the location of the view section in a spherical projection, due to stretching in the equirectangular projection at locations further away from the middle horizontal line and squeezing in the equirectangular projection at locations closer to the middle horizontal line, the corresponding portion in an equirectangular projection may be stretched and/or squeezed. In FIG. 5a, the corresponding portion (521) is stretched at the top of the corresponding portion (521) and squeezed towards the bottom of the corresponding portion (521). The panoramic video playback system sets a rectangular bounding box (524) around the corresponding portion (521) in the equirectangular projection (520). The identified section defined by the bounding box (524) can be used to limit operations such as color conversion operations and decoding operations when reconstructing the input equirectangular projection (520).

Thus, the identified section, which includes the corresponding portion (521) of the equirectangular projection (520) for the view direction and field of view, includes a buffer area around the corresponding portion (521). In this way, the identified section can be aligned with boundaries of groups of sample values (e.g., blocks, slices, tiles) for different operations in the reconstruction process. The buffer area also gives some room for movement, allowing rapid feedback and also providing for reconstruction of content that may be used for reference in later decoding operations if the view direction changes gradually. Also, if the view direction for the application is a predicted view direction (e.g., based on a rate of change in view direction or other pattern of a viewer), the buffer area provides "extra" reconstructed content of the equirectangular projection (520), for correction between the predicted view direction and an actual view direction later specified by a viewer.

Figure 5B:
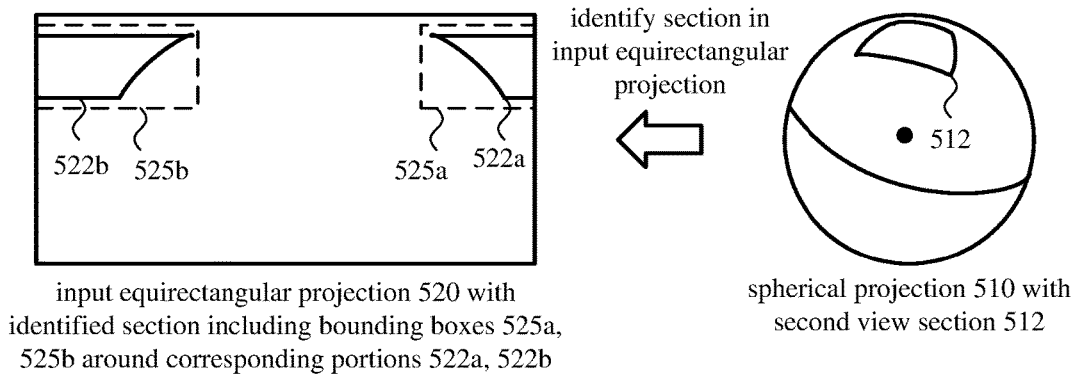

FIG. 5b shows an example of identification of a section of the input equirectangular projection (520) that corresponds to a second, different view section (512) of the spherical projection (510) for the picture of panoramic video. The panoramic video playback system finds the second view section (512) of the spherical projection (510) based on a view direction and field of view. Based on the second view section (512), the panoramic video playback system identifies a different section in the input equirectangular projection (520). Specifically, the panoramic video playback system identifies two portions (522a, 522b) of the picture in the equirectangular projection (520) that correspond to the second view section (512) of the spherical projection (510). The corresponding portions (522a, 522b) "wrap around" the picture in the equirectangular projection (520). In FIG. 5b, the corresponding portions (522a, 522b) are stretched extensively towards the top of the corresponding portions (522a, 522b). The panoramic video playback system sets rectangular bounding boxes (525a, 525b) around the corresponding portions (522a, 522b) in the equirectangular projection (520). The identified section defined by the bounding boxes (525a, 525b) can be used to limit operations such as color conversion operations and decoding operations when reconstructing the input equirectangular projection (520).

FIGS. 5a and 5b depict an input equirectangular projection. Alternatively, the input projection can be a cubemap projection. In a cubemap projection, depending on the location of a view section in a spherical projection, the section of the input cubemap projection that includes the corresponding portion (within a bounding box or bounding boxes) can be found in a single face of the cube, two faces across an edge, three faces in a corner, or even more faces if the identified section is large enough.

V. Example Architectures for Rendering of Panoramic Video.

When a panoramic video playback system receives panoramic video, the panoramic video playback system renders views of the panoramic video. This section describes various aspects of example architectures for playing back panoramic video, including use of view-dependent operations, re-projection between flat projections in application rendering mode, and features of an interface for platform rendering mode. Example architectures described in this section support playback in platform rendering mode or in application rendering mode.

In some example implementations, in platform rendering mode, a module of the panoramic video playback system provides a screen projection to an application (e.g., to a buffer indicated by the application for rendering). The application can be a lightweight application that does not itself perform rendering operations for panoramic video, which simplifies implementation for the application. For example, the application is a news viewer, real estate site listing application, or other application that does not specialize in presentation of panoramic video. Instead, the application provides a view direction and may also provide a field of view, and the "platform" (system-provided modules of the panoramic video playback system) performs operations to generate a screen projection. Alternatively, the application can set a source for view direction and field of view (e.g., a source based on one or more sensors, such as one or more accelerometers, gyroscopes, tilt sensors, optical sensors, cameras, etc., or a source of user input events for key presses, mouse cursor movements, mouse scroll wheel movements, remote control input, game controller input, touch screen input, etc.), and the platform gets the view direction and field of view information from that source. The application may also have an on/off control for rendering. In platform rendering mode, view-dependent operations may be used, but re-projection between flat projections is not used.

In some example implementations, in application rendering mode, a module of the panoramic video playback system provides a flat projection to an application. The flat projection can be an equirectangular projection or a cubemap projection. In application rendering mode, the application includes a module that performs additional transformations to the sample values of the flat projection (e.g., mapping to spherical projection, mapping to screen projection) so as to generate one or more screen projections appropriate for the application, which gives the application more control over rendering decisions. For example, the application is a virtual reality application, augmented reality application, or specialty media application for panoramic video. In application rendering mode, view-dependent operations may be used, and re-projection between flat projections may be used. Application rendering mode may be called frame server mode—the "platform" (system-provided modules of the panoramic video playback system) extracts individual pictures (frames) and serves the pictures to the application on a picture-by-picture basis for playback. In application rendering mode, different applications can use different approaches to rendering of flat projections. For a mobile device or computer monitor, a single screen projection may be rendered. Or, for a head-mounted display (or mobile device held in a head-mounted band), an application may generate two screen projections, for the left and right eyes, respectively.

A. Example Rendering Architectures for Panoramic Video.

FIG. 6 shows an example architecture for a panoramic video playback system (600) that supports view-dependent operations and re-projection operations. In addition to a display device (690) and media server (630), the example architecture includes a panoramic video playback system (600) with a view-dependent operation controller (610), streaming controller (620), input buffer (640), video decoder (650), color converter (660), mapper (670), and application (680). The application (680) can be provided by a third party or packaged as part of the panoramic video playback system (600). The application (680) can separated from other modules of the panoramic video playback system (600) (system-provided modules) by an application programming interface ("API"). Examples of APIs are described in sections V.C and V.D.

In the scenario shown in FIG. 6, the panoramic video playback system (600) limits operations of the color converter (660) to an identified section of an input projection for a picture of panoramic video. In other scenarios, the panoramic video playback system (600) limits operations of the video decoder (650) to an identified section of an input projection for a picture of panoramic video, in addition to limiting operations of the color converter (660). In still other scenarios, the panoramic video playback system (600) instructs the streaming controller (620) to limit the encoded data that is requested to be encoded data for an identified section of an input projection for a picture of panoramic video, in addition to limiting operations of the video decoder (650) and the color converter (660). These scenarios are further detailed below. In some cases, the panoramic video playback system (600) does not limit actions of its modules to an identified section of an input projection for a picture of panoramic video.

The display device (690) can be a head-mounted display, computer monitor, television screen, mobile device screen, or other type of display device.

A data store (not shown) can store various settings for the panoramic video playback system (600). For example, the settings can include information provided by the application (680) when the application (680) is installed. Or, the settings can include information provided by the application (680) at the start of a playback session (e.g., a memory location of a buffer to which screen projections should be provided in platform rendering mode, a source for view direction and/or field of view). Other modules can interact with the data store across an interface.

The view-dependent operation controller (610) is configured to receive an indication of a view direction (682) for the application (680). In FIG. 6, the application (680) provides the indication of the view direction (682). For example, the view direction (682) is specified as (1) a heading in degrees or radians from side to side (i.e., yaw, or pan) from a central view/camera position and (2) an inclination in degrees or radians up or down (i.e., pitch, or tilt) from the view/camera position. The view direction (682) can also include (3) a rotation in degrees or radians of the view (i.e., roll) from the view/camera position. Alternatively, the view direction (682) can be parameterized in some other way (e.g., as a matrix of affine transform coefficients that specify a spatial rotation in three dimensions using Euler angles or quaternion units, which correspond to heading, pitch, and roll values). Instead of the application (680), another source (e.g., a source based on one or more sensors such as one or more accelerometers, gyroscopes, tilt sensors, optical sensors, cameras, etc., or a source of user input events for key presses, mouse cursor movements, mouse scroll wheel movements, remote control input, game controller input, touch screen input, etc.) can provide the indication of the view direction. In some configurations, the view-dependent operation controller (610) is also configured to receive an indication of a field of view (684) for the application (680), from the application (680) or another source. The field of view can be specified in degrees (e.g., 90 degrees for normal view, 120 degrees for wide view) or radians. The field of view (684) can be defined for the application (680) or for a playback session. Or, the field of view (684) can change dynamically (e.g., to zoom in or zoom out) during a playback session.

The view-dependent operation controller (610) is further configured to identify, based at least in part on the view direction (682), a section of the picture of panoramic video in an input projection. For example, the input projection is an equirectangular projection, and the identified section is a contiguous portion of the equirectangular projection or multiple non-contiguous portions that wrap around an edge of the equirectangular projection. Alternatively, the input projection can be a cubemap projection, and the identified section can be a contiguous portion of one or more faces of the cubemap projection or multiple non-contiguous portions that wrap around one or more edges of an "unfolded" cubemap projection.

To identify the section of the picture of panoramic video in the input projection, the view-dependent operation controller (610) can be configured to use the view direction (682) to identify a view section of a spherical projection, then determine one or more portions of the picture of panoramic video in the input projection that correspond to the view section in the spherical projection. For example, given a view section of the spherical projection, the view-dependent operation controller (610) can apply the inverse of the equirectangular-to-spherical projection to identify the corresponding portion(s) in the equirectangular projection. The corresponding portion(s) of the picture of panoramic video in the input projection can have an irregular boundary. To address this possibility, the view-dependent operation controller (610) can be further configured to define, for the identified section, a bounding box around the corresponding portion(s) of the picture of panoramic video in the input projection. If the input projection includes multiple corresponding portions (e.g., across an edge), bounding boxes can be defined around the respective corresponding portions.

When the view-dependent operation controller (610) receives an indication of a field of view (684) for the application (680), the view-dependent operation controller (610) can use the field of view (684) when identifying the section of the picture of panoramic video in the input projection. Thus, the view-dependent operation controller (610) can be configured to use the view direction and the field of view to identify a view section of a spherical projection, then determine one or more portions of the picture of panoramic video in the input projection that correspond to the view section in the spherical projection. The view-dependent operation controller can define, for the identified section, a bounding box (or bounding boxes) including buffer area(s) around the corresponding portion(s) of the picture of panoramic video in the input projection.

The view-dependent operation controller (610) passes a control signal (612) to other modules of panoramic video playback system (600), which indicates the identified section of the picture of panoramic video in the input projection. For example, the control signal specifies the bounding box or bounding boxes for the identified section. In FIG. 6, the view-dependent operation controller (610) passes the control signal (612) to the color converter (660). In the scenario shown in FIG. 6, the view-dependent operation controller (610) is configured to limit operations of the color converter (660) to the identified section. In other scenarios (described below) the view-dependent operation controller (610) passes the control signal (612) to the streaming controller (620) and/or the video decoder (650), and operations of those modules are limited to the identified section. Alternatively, the view-dependent operation controller (610) can control operations of other modules of the panoramic video playback system (600) in some other way, so as to limit operations as described herein.

In FIG. 6, the view-dependent operation controller (610) is separate from the streaming controller (620), the video decoder (650), and the color converter (660). The view-dependent operation controller (610) sends a control signal (612) to the streaming controller (620), the video decoder (650), and/or the color converter (660), which indicates the identified section. Although shown separately in FIG. 6, the view-dependent operation controller (610) can be combined with the mapper (670) (i.e., part of the mapper (670)). The view-dependent operation controller (610) can also be part of the streaming controller (620), the video decoder (650), and/or the color converter (660).

The streaming controller (620) is configured to request encoded data for at least one section of a picture of panoramic video in an input projection (e.g., when so instructed by the view-dependent operation controller (610) or otherwise). The streaming controller (620) can request encoded data for all of a picture of panoramic video. Or, the streaming controller (620) can request encoded data for just an identified section of a picture of panoramic video. Depending on the scenario, the streaming controller (620) can send a request for encoded data to the media server (630) or a media store (631). In the scenario shown in FIG. 6, the playback controller (620) sends a request (622) for encoded data for all of a picture of panoramic video to the media server (630).

Thus, the streaming controller (620) can limit the regions (e.g., slices, tiles) of the picture of panoramic video in the input projection for which encoded data is requested. When the encoded data is partitioned for specific spatial regions, the streaming controller (620) can request encoded data for the regions that cover the bounding box(es) for the identified section, and not request encoded data for other sections of the picture of panoramic video in the input projection.

The media server (630) can be a Web server or other server, connected over a network, that stores encoded data for video and streams it to client systems for playback. The media server (630) can store encoded data for panoramic video. The encoded data can be partitioned into encoded data for different regions (e.g., slices, tiles) of a picture. In the scenario shown in FIG. 6, the media server (630) streams encoded data (632) for an entire picture of panoramic video to the panoramic video playback system (600). In other scenarios, the media server (630) may stream encoded data (632) for an identified section of a picture of panoramic video to the panoramic video playback system (600) (e.g., encoded data for spatial regions that cover the identified section).

If a media server (630) is not used, the panoramic video playback system (600) can retrieve encoded data from a media store (631). The media store (631) can be a magnetic disk, optical storage media, non-volatile memory, or other storage or memory, connected locally to the panoramic video playback system (600), that stores encoded data for panoramic video and provides it to the panoramic video playback system (600) for playback. The encoded data can be partitioned into encoded data for different regions (e.g., slices, tiles) of a picture. Depending on the scenario, the media store (631) may provide encoded data for all or only an identified section of a picture of panoramic video in an input projection.

The input buffer (640) is configured to store the encoded data. The input buffer (640) provides encoded data (e.g., encoded data (632) for all of a picture of panoramic video, or an identified section) to the video decoder (650). The video decoder is (650) configured to decode at least some of the encoded data, thereby producing sample values (652) of the at least one section of the picture of panoramic video in the input projection. Depending on implementation and the format of the encoded data, the video decoder (650) can decode the encoded data in a manner consistent with the H.265/HEVC standard, ISO/IEC 14496-10 standard (also known as H.264/AVC), another standard, or a proprietary format such as VP8 or VP9, or a variation or extension thereof. The sample values (652) of the picture of panoramic video in the input projection are, for example, 8-bit sample values or 10-bit sample values in a YUV color space, with a chroma sampling rate of 4:2:0. Alternatively, the sample values output by the video decoder (650) are in another format.

In some scenarios, the video decoder (650) limits decoding operations to the identified section of a picture of panoramic video in the input projection. In particular, the video decoder (650) limits decoding operations to the bounding box(es) of the identified section. The bounding box(es) may align with boundaries of spatial regions of encoded data (e.g., for tiles, for slices), or the bounding box(es) may fit within some set of regions of encoded data (e.g., for tiles, for slices).

In some cases, even when an identified section is provided for decoding, the video decoder (650) might still decode the entire picture if the picture will be used for reference in later decoding operations. The video decoder (650) can make this determination based on a syntax element in the bitstream (e.g., a "used for reference" flag for a picture). Or, the video decoder (650) can make this determination based on a rule (e.g., that B pictures are never used as reference pictures by an encoder or during a particular encoding session, but I pictures and P pictures may be used as reference pictures). Thus, the video decoder (650) can be configured to determine whether the picture of panoramic video in the input projection is used for reference during decoding of any subsequent picture of panoramic video in decoding order and, if so, decode encoded data for all of the picture of panoramic video in the input projection, producing sample values of all of the picture of panoramic video in the input projection. The video decoder (650) can also be configured to decode encoded data for only the identified section if the picture is not used for reference, producing sample values of only the identified section of the picture of panoramic video in the input projection. Alternatively, in addition to decoding any content within the bounding box(es), the video decoder (650) can decode regions (e.g., slices, tiles) of the picture that are indicated to be used for reference in later motion compensation (e.g., according to metadata, according to analysis of syntax elements of subsequent pictures).

The color converter (660) is configured to convert at least some of the sample values (652) produced by the video decoder from a first color space to a second color space. For example, the first color space is a YUV color space, and the second color space is an RGB color space. Before color space conversion or as part of color space conversion, the color converter (660) may perform chroma sample rate upsampling, to restore chroma sample values to have the same resolution as luma sample values in the decoded video.

The mapper (670) is configured to map at least some of the color-converted sample values (662) to an output projection. In platform rendering mode, to determine a screen projection, the mapper (670) can perform operations as shown and described with reference to FIG. 4, and as further shown and described with reference to FIGS. 8 and 9a-9c. In some example implementations, the mapper (670) can skip the intermediate, spherical projection and directly determine appropriate sample values of the screen projection from the sample values of the input projection. In application rendering mode, the mapper (670) can determine an output flat projection as described in the next section, using the color-converted sample values (662) for the identified section or sample values (652) from the video decoder (650).

The mapper (670) produces an output projection that includes sample values. (FIG. 6 shows the mapper (670) producing color-converted sample values (672) in an output projection.) For platform rendering mode, the output projection is a screen projection. For application rendering mode, the output projection is an output flat projection (e.g., equirectangular projection, cubemap projection). The output projection can be provided to the application (680) in various ways. For example, the output projection is provided in a buffer specified by the application (680). Or, the output projection is provided in a buffer specified by the mapper (670), and the memory location of the buffer is provided to the application (680).

In summary, for platform rendering mode, the input projection can be an equirectangular projection or cubemap projection, and the output projection is a screen projection (686) for the application. The mapper (670) is configured to, for locations in the screen projection (686), determine corresponding locations in the input projection. The locations in the screen projection (686) and the corresponding locations in the input projection are associated with locations in a view section of an intermediate, spherical projection. The view section of the intermediate, spherical projection is indicated by the view direction (and field of view). The mapper (670) is further configured to assign sample values to the locations in the screen projection (686) based on the at least some of the color-converted sample values (662) at the corresponding locations in the input projection, respectively, and provide the screen projection (686) to the application (680).

To assign sample values to the locations in the screen projection (686) without intermediate projection to a spherical projection, the mapper (670) can be configured to select sample values and/or interpolate (e.g., using bilinear interpolation) between sample values among the at least some of the color-converted sample values (662) at the corresponding locations in the input projection, respectively. Alternatively, in order to determine the corresponding locations and assign sample values, the mapper (670) can be configured to project the at least some of the color-converted sample values (662) from the input projection to the view section of the intermediate, spherical projection, and then project the at least some of the color-converted sample values from the view section of the intermediate, spherical projection to the screen projection (686). The application (680) provides the screen projection (686) to the display device (690), or otherwise indicates that the screen projection (686) is available in a buffer for display by the display device (690).

For application rendering mode, the input projection is an input flat projection, and the output projection is an output flat projection. To produce the output flat projection, the mapper is configured to re-project at least some color-converted sample values (662) or sample values (652) in the input flat projection towards a center location for the view direction. The application (680) then maps the output projection to one or more screen projections (686), which are provided to the display device (690). Section VI details operations that can be performed for re-projection between flat projections in application rendering mode.

In the scenario shown in FIG. 6, the view-dependent operation controller (610) is configured to limit operations of the color converter (660) to the identified section. In this scenario, the view-dependent operation controller (610) is not configured to limit operations of the streaming controller (620) or the video decoder (650) to the identified section. Thus, in this scenario, the streaming controller (620) is configured to request encoded data for the entire picture of panoramic video in the input projection. The video decoder (650) is configured to decode encoded data for the entire picture of panoramic video in the input projection, producing sample values of all of the picture of panoramic video in the input projection. The color converter (660) is configured to convert sample values from the first color space to the second color space for only the identified section, however, and not other sections of the picture.

In another scenario, in addition to limiting operations of the color converter (660), the view-dependent operation controller (610) is configured to limit operations of the video decoder (650) (but not the streaming controller (620)) to the identified section. In this scenario, the streaming controller (620) is configured to request encoded data for the entire picture of panoramic video in the input projection. The video decoder (650) is configured to selectively decode encoded data for only the identified section in the input projection (and not other sections in the input projection). The color converter (660) is configured to convert sample values from the first color space to the second color space for only the identified section (and not other sections in the input projection).

In still another scenario, in addition to limiting operations of the color converter (660), the view-dependent operation controller (610) is configured to limit operations of the video decoder (650) and the streaming controller (620) to the identified section. In this scenario, the streaming controller (620) is configured to request encoded data for only the identified section (and not other sections of the input projection). The video decoder (650) is configured to selectively decode encoded data for only the identified section (and not other sections of the input projection). The color converter (660) is configured to convert sample values from the first color space to the second color space for only the identified section (and not other sections of the input projection).

The panoramic video playback system (600) can also selectively remove any limitations on operations of the streaming controller (620), video decoder (650), and color converter (660). For example, if playback of panoramic video is paused, the streaming controller (620) can request encoded data for an entire input projection (or the rest of a partially decoded input projection), the video decoder (650) can decode the entire input projection (or the rest of a partially decoded input projection), and the color converter (660) can perform color conversion operations for the entire input projection (or the rest of the partially reconstructed input projection). In this way, the entire input projection is available for rendering should the viewer choose to navigate through the "paused" environment of the panoramic video.

Depending on implementation and the type of processing desired, modules of the panoramic video playback system (600) can be added, omitted, split into multiple modules, combined with other modules, and/or replaced with like modules. In alternative embodiments, video playback systems with different modules and/or other configurations of modules perform one or more of the described techniques. Specific embodiments of panoramic video playback systems typically use a variation or supplemented version of the panoramic video playback system (600). The relationships shown between modules within the panoramic video playback system (600) indicate general flows of information in the panoramic video playback system (600); other relationships are not shown for the sake of simplicity. In general, a given module of the panoramic video playback system (600) can be implemented by software executable on a CPU, by software controlling special-purpose hardware (e.g., a GPU or other graphics hardware for video acceleration), or by special-purpose hardware (e.g., in an ASIC). In particular, in some example implementations, color conversion operations (including view-dependent operations limited to an identified section of a picture of panoramic video in an input projection) are implemented with shader instructions executable on a GPU, and re-projection operations are implemented with shader instructions executable on a GPU.

B. Example Operations in Scenarios for Limiting Color Conversion.

FIG. 7 shows a generalized technique (700) for playback of panoramic video with view-dependent operations. A panoramic video playback system such as the panoramic video playback system (600) shown in FIG. 6 or other panoramic video playback system performs the technique (700).

The panoramic video playback system receives (710) an indication of a view direction for an application, such as through an interface (such as described below) or from a view direction source specified through an interface (such as described below). For example, the indication of the view direction is a set of heading, pitch, and roll values for the view direction. Or, the indication of the view direction is a set of affine transform coefficients that specify a spatial rotation for the view direction. Or, the view direction is specified in some other way. The panoramic video playback system can receive the indication of the view direction from the application or from a source specified by the application. The panoramic video playback system can also receive an indication of a field of view for the application.

Based at least in part on the view direction, the panoramic video playback system identifies (720) a section of a picture of panoramic video in an input projection. For example, the input projection is an equirectangular projection or a cubemap projection.

The panoramic video playback system receives (730) encoded data for at least one section of the picture of panoramic video in the input projection and decodes (740) at least some of the encoded data. This produces sample values of the at least one section of the picture of panoramic video in the input projection. As explained above, in other scenarios, operations of the decoding (740) can be limited to the identified section. In still other scenarios, the panoramic video playback system further limits the encoded data that is requested (and hence received) to be the encoded data for the identified section.

The panoramic video playback system converts (750) at least some of the sample values from a first color space to a second color space. Operations of the converting (that is, color conversion operations) are limited to the identified section.

The panoramic video playback system maps (760) at least some of the color-converted sample values to an output projection. For example, the output projection is a screen projection (for platform rendering mode) or output flat projection such as an output equirectangular projection or cubemap projection (for application rendering mode).

The panoramic video playback system can repeat the technique (700) shown in FIG. 7 on a picture-by-picture basis.

C. Example Interface for Platform Rendering Mode.

FIG. 8 shows features of an example architecture (800) for a panoramic video playback system that includes one or more modules, such as one or more modules of a panoramic video rendering engine (804), operating in platform rendering mode. The example architecture (800) can be a variation, or particular implementation, of the architecture described with reference to FIG. 6, which supports view-dependent operations. Alternatively, the example architecture of FIG. 8 can be used in a system without support for view-dependent operations (or which support is not activated). For example, the architecture (800) can operate as described for FIG. 6 (such as performing at least some of the operations depicted in FIG. 4), but without limiting the operations to particular sections or locations of an input projection to be included in a screen projection.

In FIG. 8, the panoramic video rendering engine (804) includes a mapper (808). The mapper (808) is a module provided by the engine (804), and thus forms part of a platform that supports platform rendering of panoramic video. The mapper (808) is configured to map at least some sample values (e.g., color-converted sample values provided by a color converter, or sample values provided by a decoder) to sample values of an output projection, such as screen projection (816).

The mapper (808) can include a controller. In other cases, the controller can be a separate module of the rendering engine (804) that is in communication with the mapper (808). When a separate controller is included, actions specified hereinafter as occurring with the mapper (808) can be carried out by the controller, or by the controller in communication with the mapper (808). In some aspects, the controller can be a view-dependent operation controller (e.g., the view-dependent operation controller (610) of FIG. 6).

In particular examples, the mapper (808) is configured to re-project sample values in an input projection (820) (e.g., equirectangular projection or cubemap projection) with respect to a view direction (824) indicated for an application (828). In some cases, the re-projected image is centered about the view direction (824). The re-projected image, or output projection can be the screen projection (816) (e.g., an image suitable for display on a display device (832)). Thus, in platform rendering mode, the application (828) can specify input, such as the view direction (824), to the panoramic video rendering engine (804). In turn, the panoramic video rendering engine (804) can provide the screen projection (816) to a screen projection buffer for the application (828) (including, at least in some cases, to a buffer under control of the application itself, a buffer at a memory location specified by the application, or buffer at a memory location specified by a panoramic video rendering engine).

The input to the video panoramic video rendering engine (804) can be provided by one or more hardware sensors on or associated with the display device (832), which can thus also serve as an input device. For example, virtual reality googles or headsets can include both a display and motion sensors or tracking devices that can provide information regarding the view direction (824). In other cases, input can be provided by an input device that is physically separate from the display device (832) (e.g., a keyboard, game controller, mouse, etc.). In yet further cases, the input can be provided by the application itself (that is, the application can control or otherwise modify the view direction (824)).

Other types of input can be provided or specified by the application (828). For example, the application (828), or a sensor of the input/display device (832) or other sensor, can specify a field of view (836) to be used by the video panoramic video rendering engine (804). The application (828) can specify, or specify a source of (e.g., the input/display device (832) or another input device), playback control commands, such as commands to rewind or fast-forward playback, to pause or resume playback, or to control the playback speed.

In other cases, the application (828) can use the panoramic video rendering engine (804) for platform rendering, but does not provide one or both of the view direction (824) and the field of view (836) (or source for the view direction (824) and/or field of view (836)). For example, the mapper (808) can provide a screen projection (816) based on default values for the view direction (824) or the field of view (836). Or, default values can be specified in the input projection (820).

The mapper (808) is configured to determine locations in the input projection (820) and render them in the screen projection (816). The locations in the screen projection (816), and the corresponding locations in the input projection (820), are associated with locations in a view section (image locations) specified by the view direction (824) and the field of view (836). The locations in the screen projection (816), and the corresponding locations in the input projection (820), can be associated with locations in a view section of an intermediate, spherical projection, also indicated by the view direction (824) and the field of view (836), such as discussed above regarding FIG. 6.

The mapper (808) is configured to assign sample values to the locations in the screen projection (816) based on sample values at corresponding locations in the input projection (820), and provide the screen projection to the application (828). To assign sample values to the locations in the screen projection (816) without mapping to the intermediate, spherical projection, the mapper (808) can be configured to select sample values and/or interpolate (e.g., using bilinear interpolation) between sample values at the corresponding locations in the input projection (820), respectively. Alternatively, in order to determine the corresponding locations and assign sample values, the mapper (808) can be configured to project sample values in the input projection (820) to the view section of the intermediate, spherical projection, and then project the sample values from the view section of the intermediate, spherical projection to the screen projection (816).

In at least some cases, the panoramic video rendering engine (804) can include additional modules, and carry out addition functions, to prepare the input projection (820) for rendering by the mapper (808). In particular examples, the panoramic video rendering engine (804) can include modules depicted in FIG. 6, including the streaming controller (620), the input buffer (640), the video decoder (650), and the color converter (660). In at least some aspects, these modules can operate as described in conjunction with FIG. 6. In specific examples, operations of one or more of the modules of FIG. 6, (such as the video decoder (650) and/or the color converter (660)) can be limited to sections (or locations) of the input projection (820) that will be rendered in the screen projection (816). In other cases, the operations are not so limited.

When the panoramic video rendering engine (804) includes a color converter, the color converter can be configured to convert sample values, produced by a video decoder, from a first color space to a second color space. In this case, the mapper (808) is configured to map color-converted sample values to the screen projection (816). For locations in the screen projection (816), the mapper (808) can be configured to determine corresponding locations in the input projection (820). The locations in the screen projection (816) and the corresponding locations in the input projection (820) are associated with locations in a view section of an intermediate, spherical projection. The view section of the intermediate, spherical projection is indicated by the view direction (824). The mapper (808) is further configured to assign sample values to the locations in the screen projection (816) based on the color-converted sample values at the corresponding locations in the input projection (820), respectively, and provide the screen projection (816) to the application (828) (e.g., to a buffer under control of the application (828), a buffer at a memory location specified by the application (828), or a buffer at a memory location specified by a module of the panoramic video rendering engine (804)).

To assign sample values to the locations in the screen projection (816) without mapping to the intermediate, spherical projection, the mapper (808) can be configured to select color-converted sample values and/or interpolate between color-converted sample values at the corresponding locations in the input projection (820). Alternatively, in order to determine the corresponding locations and assign sample values, the mapper can be configured to project color-converted sample values from the input projection (820) to the view section of the intermediate, spherical projection, and then project the color-converted sample values from the view section of the intermediate, spherical projection to the screen projection (816).

The mapper (808) can be configured to identify, depending on the view direction (824) for the application (828), a section in the input projection (820). The mapper (808) can also accept, as input, the field of view (836) for the application (828). In this case, the mapper (808) can be configured to identify, depending on the view direction (824) and the field of view (836) for the application (828), a section in the input projection (820). The identified section in the input flat projection (820) can be a contiguous portion of the input projection (820) or multiple non-contiguous portions that wrap around an edge of the input projection.

The panoramic video playback system (800) further includes the application (828), which may be provided by a third party. The application (828) can output the screen projection (816) to the display device (832), such as to a head-mounted display, computer monitor, mobile device display, television, or other display device. Or, the application (828) can specify a memory location of a buffer to which the screen projection (816) is output by the mapper (808), for output by the display device (832). The application (828) can provide a user interface (840), through which a user can retrieve and set rendering properties for the panoramic video rendering engine (804), such as the view direction (824), the field of view (836), video source (e.g., camera, media server), or a source (e.g., hardware sensor or other input device, including associated with the input/display device (832)) of the view direction or field of view.

The application (828) can access the services of the panoramic video rendering engine (804) through an interface (844), as such as an application program interface ("API"). In particular, the interface (844) can receive the view direction (824) or the field of view (836) from the application (828). Or, the application (828) can specify, through the interface (844), an input device as the source of the view direction (824) and/or the field of view (836), after which the source provides the view direction (824) and/or field of view (836) to the controller. The application (828) can receive the screen projection (816) in various ways. For example, in some cases, the screen projection (816) is provided in a buffer under control of the application (828). In other cases, the screen projection (816) can be output for display on the display device (832), and the screen projection (816) can be directly provided to a buffer at a memory location specified by the application (828) or a buffer at a memory location specified by a module of the panoramic video rendering engine (804) for the display device (832), or at another memory location as specified by the application (828) or module of the panoramic video rendering engine (804).

The interface (844) can provide a method to allow the application (828) to specify the field of view (836) for the application (828). Or, the interface (844) can provide a method to allow the application (828) to specify a source, such as an input sensor associated with the display device (832) or other input sensor, to provide the field of view (836) for the application (828). Typically, the field of view (836) can be specified in degrees or radians. An example method for setting the field of view (836) using the interface (844) can be:

```
void setFOV (MediaObject panoramic Video, double FOV)
{
    panoramicVideo.PlaybackSession.SphericalVideoProjection.
    HorizontalFieldOfViewInDegrees = FOV;
},
``` where the HorizontalFieldofView data member of the panoramic Video MediaObject is provided to the mapper (808).

The interface (844) can also provide a method to allow the application (828) to specify the view direction (824) for the application (828). Or, the interface (844) can provide a method to allow the application (828) to specify a source, such as an input sensor associated with the display device (832) or other input sensor, to provide the view direction (824) for the application (828). Typically, the view direction (824) can be specified in degrees or radians for each of yaw, pitch, and roll, as described above. An example method for setting the view direction (824) can be:

```
void setViewDirection (MediaObject panoramicVideo, double heading,
double pitch, double roll)
{
panoramicVideo.PlaybackSession.SphericalVideoProjection.
ViewOrientation = Quaternion.CreateFromYawPitchRoll(heading,
pitch, roll);
},
``` where the ViewOrientation data member of the panaoramicVideo MediaObject is set to the quaternion value created using the CreateFromYawPitchRoll function of the Quaternion abstract data type, using the yaw, pitch, and roll values provided. The ViewOrientation data member can be provided to the mapper (808). Although described as provided heading, pitch, and roll, view direction (824) can include more or fewer parameters. For instance, in some cases, only heading and pitch may be used in panoramic video replay. In other cases, additional parameters, such as parameters specifying movement (e.g., forward and backward movement, lateral movement, or vertical movement) can be provided through the interface (844) or provided by an input source.

In some cases, in addition to the view direction (824) and field of view (836), the panoramic video rendering engine (804) can use an overscan (or buffer) value. The overscan value can represent a temporarily increased field of view (836) value. The use of the overscan amount can provide a larger view section in the spherical projection. If the view direction (824) has changed before the screen projection (816) is provided to the application (828), the size of the spherical projection can be reduced to the size of the field of view (836), centered around the updated view direction, and this updated spherical projection can be used to produce the screen projection (816). This technique can help reduce any delay or lag between a change in view direction (824) and the display of the updated screen projection (816).

In some cases, the above methods can use values passed by a calling application (828). The values can be values as-received by the application (828), such as from a user or input device. The values can also be values that are created or modified by the application (828). For example, the values may be converted by the application (828) between different coordinate systems, or converted to a coordinate system, or may be adjusted according to a reference point.

In other cases, the mapper (808) can use values provided by an input device or other source set by the application (828). For example, rather than passing numerical values (e.g., integers or doubles), the setFOV or setViewDirection methods (or other methods to set the field of view (836) or view direction (824)) can accept a memory location (e.g., a pointer). The memory location can receive field of view (836) or view direction (824) values provided by the input device, such as through a sensor of the input device (e.g., an accelerometer, magnetometer, or gyroscope). In this way, the values used by the mapper (808) can change automatically as the input device is manipulated. In some cases, an event listener can be specified that calls a method of the interface (844) (e.g., setViewDirection) to update the view direction (824) (or, in some cases, the field of view (836)), when the view direction is changed.

The interface (844) may include methods to exchange other information between the application (828) and the panoramic video rendering engine (804). For example, the application (828), through the interface (844), can provide information about a window (e.g., display segment or frame) in which the screen projection (816) is to be displayed. The information can include the identity or screen location of the window, and the size (including shape) of the window, as well as a memory location of a buffer to which the screen projection (816) should be provided. In addition to, or in place of, providing information about a display window, the application (828) can provide, through the interface (844), an identifier of a display device to which the screen projection (816) is output, and/or display parameters (e.g., screen shape, size, capabilities) that can be used to prepare the screen projection (816).

An event hander can be defined, such as in the application (828) or the interface (844), to modify panoramic video parameters, including the view direction (824) or field of view (836), in response to user input. For example, the following method can move the pitch of the view direction (824) one degree up when an up arrow key press is detected:

```
void OnKeyUp( )
{
    pitch += 1;
    mediaPlayer.PlaybackSession.SphericalVideoProjection.
ViewOrientation = Quaternion.CreateFromYawPitchRoll(heading,
pitch, 0)
}
```

An analogous method can move the pitch of the view direction (824) one degree down when a down arrow key press is detected. In another event handler, such as in the application (828) or interface (844), the heading (yaw) of the view direction (824) can be similarly altered when left arrow key presses (heading −=1) or right arrow key presses (heading +=1) are detected, such as:

```
void OnKeyRight( )
{
    heading += 1;
    mediaPlayer.PlaybackSession.SphericalVideoProjection.
ViewOrientation = Quaternion.CreateFromYawPitchRoll(heading,
pitch, 0)
}
```

Some applications (828) may provide an icon or image representing features of a particular media item, including a panoramic video. For instance, an application (828) may provide a playlist listing available media items that can be played, and may display (e.g., in the user interface (840)) a snapshot of video media items. The interface (844) can detect media items that include panoramic video, and provide an overlay or other indication that the media item is a panoramic video. A suitable method can be:

```
void Item_VideoTracksChanged (MediabackItem sender,
IVectorChangedEventArgs args)
{
    if (args.CollectionChange != CollectionChange.Inserted)
    {
        return;//only make changes if an item has been inserted
    }
    else if (sender.VideoTracks[0].GetEncodingProperties( ).
SphericalVideoFrameFormat != SphericalVideoFrameFormat.None)
    {
        //display 360 overlay or indicator on or by item
    }
}
```

The interface (844) can provide for the playback of media objects that use panoramic video facilitated by platform rendering. The playback method can include setting a flag to indicate that the source video is a panoramic video having the correct input format and is to be processed using platform rendering. The playback method can also provide initial, including default, values for the view direction (824) or the field of view (836). An example playback method is:

```
MediaObject (MediaObject panoramicVideo)
{
    if (sender.PlaybackSession.SphericalVideoProjection.FrameFormat ==
        SphericalVideoFrameFormat.Equirectangular)
```

-continued

```
    {
        panoramicVideo.PlaybackSession.SphericalVideo.IsEnabled = true;
        panoramicVideo.PlaybackSession.SperhicalVideoProjection.
HorizontalFieldOfViewInDegrees = 120;
        //enable input device tracking or subscribe to event listeners, display
custom controls
            //for changing panoramic video parameters
        panoramicVideo.PlaybackSession.SphericalVideoProjection.
ViewOrientation = Quaternion.CreateFromYawPitchRoll(0, 0, 0);
    },
``` where the ViewOrientation and HorizontalFieldOfViewIn-Degrees data members of the panaoramicVideo MediaObject are specified as described above, and the IsEnabled data member is set to true if the FrameFormat data member has the appropriate value (e.g., equirectangular). If IsEnabled is true, the ViewOrientation and HorizontalFieldOfViewInDegrees data members can be passed to the mapper (808) using the interface (844) or from a source specified through the interface (844).

The playback method can provide other features. For example, the playback method can provide options if the input is not in the correct format (e.g., there is no input projection (820), or the input projection is in the incorrect format). Options can be provided for displaying the input in a supported spherical format. If the input is unprojected, the interface (844) can enable application rendering (or frame rendering) mode to carry out color conversion operations (including view-dependent operations limited to an identified section of a picture of panoramic video in an input projection), or projection or re-projection operations, with shader instructions executable on a GPU.

The interface (844) can provide additional options, such as methods to provide playback control commands or a source of playback control commands Playback control commands can include commands to rewind or fast-forward a panoramic video, pause or resume playback, or change playback speed. In particular, in some cases, playback can be paused, and the view direction of the current frame altered (e.g., a user can pause playback to "look around" a particular frame).

The architecture (800) can include additional interfaces to facilitate communication between modules for panoramic video playback. For example, the application (828) can include an interface (such as to allow the panoramic video rendering engine (804) to request an output memory location at which to buffer the screen projection (816), a view direction (824), a field of view (836), or other information). Similarly, the input/display device (832) (or separate input and display devices) can provide an interface, such as to allow the application (828) or the panoramic video rendering engine (804) to retrieve display parameters (e.g., screen shape and size) or request parameters such as view direction (824) or field of view (836).

The interface (844) can be specified in an interface definition language ("IDL"), such as the Microsoft Interface Definition Language ("MIDL"). The IDL specification can, for example, describe inputs to, and outputs from, methods of the interface (844). An IDL specification can define access to properties of a panoramic video object. For instance, an interface definition can specify a method to obtain the stereoscopic packing mode of a video file (e.g., none, stereoscopic video frames packed side by side, or stereoscopic video frames packed using frame tops and bottoms), such as using the MIDL description:

[propget] HRESULT SphericalVideoFrameFormat([out, retval] Windows.Media.MediaProperties.Sphereical-VideoGr- ameFormat*value);

An IDL specification can also define properties used in describing a panoramic video, or the interface (844). For example, an enumerated data type can be defined that describes the possible frame formats of the panoramic video, such as providing possible values of "none" (e.g., no encoding/not panoramic), "equirectangular" for input flat projection (820) encoded in equirectangular format, and "unsupported," such as if the input flat projection (820) is encoded in a panoramic format (e.g., cubemap projection) that is not supported by the panoramic video playback system (804). An example MIDL description of this enumerated data type can be:

```
typedef enum SphericalVideoFrameFormat
{
   None = 0,
   Unsupported,
   Equirectangular
} SphericalVideoFrameFormat
```

An IDL specification can define playback properties associated with panoramic video, including parameters usable by the video panoramic video rendering engine (804), such as values for view direction (824) and field of view (836). Methods of the interface (844) are described for returning whether panoramic video replay is enabled, and setting the enabled status of panoramic video replay, such as using the MIDL specifications:

[propget] HRESULT IsEnabled([out, retval] boolean*value);
    [propput] HRESULT IsEnabled([in] boolean value);

Similarly, an IDL specification can describe methods of the interface (844) for setting and retrieving the frame format of a video, such using the enumerated definition provided by the IDL specification, using descriptions such as:

[propget] HRESULT FrameFormat([out, retval] Windows.Media.MediaProperties.SphericalVideoFrameFormat*value);
    [propput] HRESULT FrameFormat([in] Windows.Media.MediaProperties.SphericalVideoFrameFormat value);

Methods for setting and retrieving the view direction (824) can be described, such as:

[propget] HRESULT ViewOrientation([out][retval] Windows.Foundation.Numerics.Quaternion*value);
    [propput] HRESULT ViewOrientation([in] Windows.Foundation.Numerics.Quaternion value);

Similarly, methods for setting and retrieving the field of view (836) can be described, such as:

[propget] HRESULT HorizontalFieldOfViewInDegrees ([out][retval] double*value);
    [propput] HRESULT HorizontalFieldOfViewInDegrees ([in] double value);

An IDL specification can also provide access to a panoramic video, such as the screen projection (816), such as through the definition:

[propget] HRESULT SphericalVideoProjection([out][retval]
    Windows.Media.Playback.MediaPlaybackSphericalVideoProjection**value);

Where the method sets "value" to a pointer to a buffer to which the screen projection (816) is output, or a pointer to an abstract data type holding information about the panoramic video (optionally including a pointer to a buffer to which the screen projection is output).

D. Example Operations Providing Screen Projection Based on View Direction Received Through Interface.

Figure 9A:
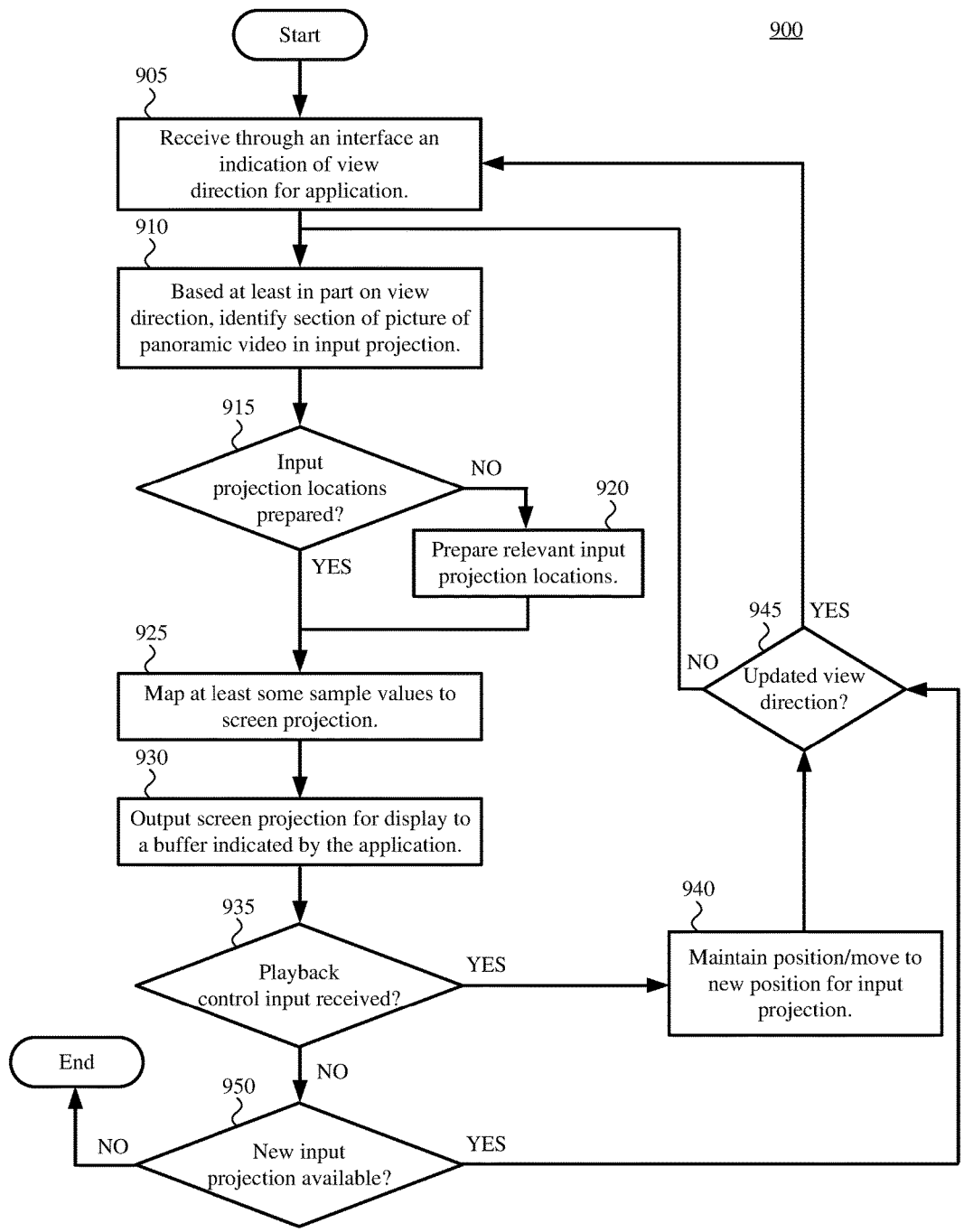
FIGS. 9a, 9b, and 9c are flowcharts illustrating, respectively, techniques for interface-mediated playback of panoramic video in platform rendering mode, operations for preparing an input projection to be mapped to a screen projection, and techniques for an application to update through an interface a view direction used by a panoramic video playback system operating in platform rendering mode.

FIG. 9a shows a generalized technique (900) for a video playback system (that is part of a "platform") to output a screen projection based, at least in part, on a view direction indication received through an interface by the system for an application. At (905), the video playback system receives, from an application through an interface, an indication of a view direction for the application. The indication may be, for example, coordinates sent by the application. Alternatively, the video playback system receives, from the application through an interface, an indication of a view direction source for view direction information, such as a sensor or device specified by the application.

At (910), based at least in part on the view direction for the application, sections of a picture of a panoramic video associated with the view direction are identified in an input projection. At (915) it is determined whether locations of the input projection (e.g., corresponding to the sections of the picture of the panoramic video) are prepared to be mapped to a screen projection. If not, the relevant locations of the input projection can be prepared at (920) (as further described with reference to FIG. 9b).

If the relevant input projection locations were determined to be prepared at (915), or after the input projection locations are prepared at (920), at least some of sample values from the prepared locations of the input projection are mapped to a screen projection at (925). The screen projection is output for display to a buffer (screen projection buffer) for the application at (930).

At (935) it is determined whether any playback control input signals have been received. Playback control input signals can include signals to rewind a video (e.g., move to an earlier frame in a sequence), fast-forward a video (e.g., move to a later frame in a sequence), pause playback, or change playback speed. If such a playback signal was received, the method (900) proceeds to (940), where the input projection source is maintained at the selected position (input projection) in the panoramic video (e.g., when playback has been paused) or moved to the position (input projection) indicated by a rewind or fast-forward action.

At (945) it is determined whether an updated view direction is available. For example, an updated view direction may be received from an input source or the application through the interface, and may be pending in a queue or buffer. The panoramic video system can check a buffer or queue, or the status of a "direction view updated" flag, to determine whether an updated view direction is available. Or, the panoramic video system can poll a source device or application to determine whether an updated view direction is available, including through a method of an interface (which can be, for example, an interface provided by the source device or the application).

In a particular example, an event handler (e.g., "on click," "on key press," "on head tilt") provides an updated view direction to a panoramic video rendering engine to be used in the method (900). In some cases, rather than checking for an updated view direction at (945), a hardware or software interrupt can signal to the method (900) that the view direction has been changed. Although described as receiving an updated view direction, the method (900) can receive other updated parameters (including at (945)). For example, the method (900) can check for, or receive, an updated field of view.

If an updated view direction is available at (945), the method (900) returns to (905) to receive the updated view direction. In at least some implementations, paused playback can include maintaining a position in a panoramic video sequence, but allowing the view direction (or, optionally, other parameters, such as field of view) to be changed. For instance, in a virtual environment, a user may wish to "look around" their current surroundings, without moving within the surroundings. Or, in the case of playback of a set video sequence (e.g., in a news story, movie, or other content), the user may wish to pause the sequence and "look around" within a particular snapshot in time of the panoramic video. In some cases, all of the relevant input projection, or a portion sufficient to render the area indicated by the view direction received at (905) can be rendered without additional preparation at (920). In other cases, such as when preparation actions were limited to those needed to render a screen projection based on a prior view direction, the relevant portions of the input projection may be prepared at (920). In yet further cases, when an appropriate playback control signal is received (e.g. pause), all of the current input projection can be prepared for a screen projection. This can speed response time, for example, if a user wishes to "look around" a current snapshot in time of the panoramic video.

If, at (945), it was determined that the view direction was not updated, the method (900) can return to (915) to determine whether the relevant locations of the input projection have been prepared and are available for rendering in the screen projection. For example, it can be determined whether the next input projection in a sequence has been prepared.

Returning to (935), it was determined that a playback control signal was not received, the method can determine at (950) if a new input projection is available. If a new input projection is available, the method can continue to (945) to determine if the view direction has been updated. If a new input projection is not available (e.g., there are no more input projections in the source of an input projection), the method (900) can end or continue until the application closes.

Figure 9B:
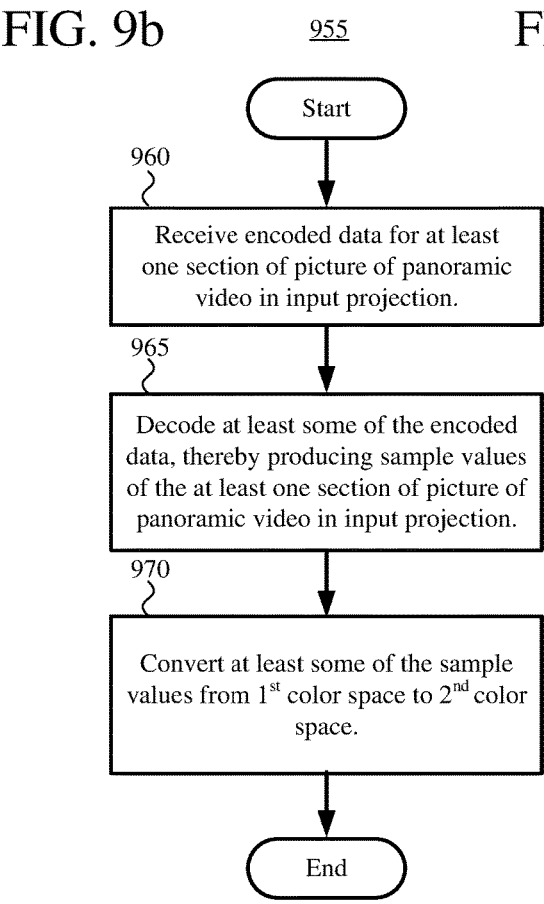

FIG. 9b illustrates a method (955) that can be carried out to prepare an input projection for mapping to a screen projection, such as in step (920) of the method (900) of FIG. 9a. At (960), encoded data for at least one section of the picture of the panoramic video in the input projection is received. At (965) at least some of the encoded data is decoded, producing sample values of the at least one section of the picture of the panoramic video in the input projection. At least some of the sample values are converted from a first color space to a second color space at (970). According to a particular aspect, at least some of the operations of the method (955) can be limited to locations that will be included in a screen projection, which can speed rendering time and conserve computing resources.

According to the method (900), and optionally the method (955), an application can use, or direct the display, of a screen projection of a panoramic video. Thus, an application is able to use the services of the panoramic video rendering engine in platform rendering mode to provide a display of panoramic video without having to itself render a projection for display. The method (900) thus can simplify the use of panoramic video in applications, enabling the creation of a wider variety of applications making use of panoramic video.

D. Example Operations for Requesting Screen Projection Based on View Direction Sent Through Interface.

Figure 9C:
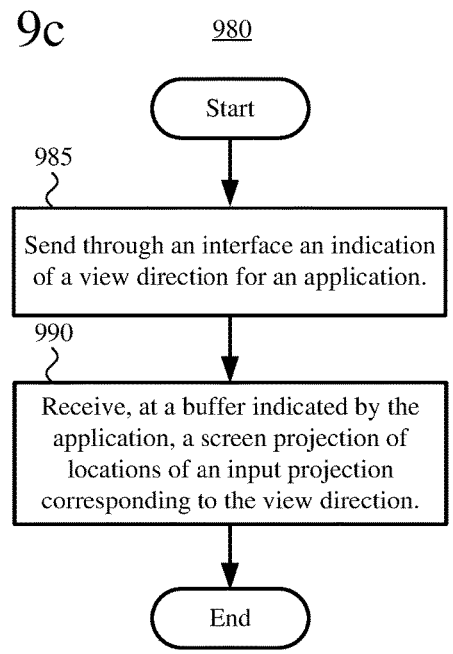

FIG. 9c shows a generalized technique (980) by which an application can request a screen projection of a panoramic video based, at least in part, on a view direction indication sent by the application through an interface. At (985), the application sends through an interface, such as an interface to a panoramic video rendering engine providing platform rendering services (e.g., having the architecture (800) of FIG. 8, or the architecture (600) of FIG. 6, or another variation thereof), an indication of a view direction for the application. Optionally, the application can provide other information, such as an indication of a field of view or a memory location for a buffer where the screen projection should be sent. Alternatively, the application can specify, through the interface, a source of view direction (e.g., hardware sensor). At (990), a memory location of a buffer (screen projection buffer) for the application receives a screen projection (such as a screen projection produced using the method (900) of FIG. 9a, optionally including the method (955) of FIG. 9b) of locations of an input projection corresponding to the view direction sent by the application.

VI. Example Re-Projection Operations for Application Rendering Mode.

In application rendering mode, a system-provided module of a panoramic video playback system (that is, part of a "platform") provides a flat projection for a picture of panoramic video to an application. The flat projection can be an equirectangular projection or cubemap projection. The application includes a mapper that performs additional transformations to sample values of the flat projection (e.g., mapping to spherical projection, mapping to screen projection), so as to generate one or more screen projections appropriate for the application. For example, the application is a virtual reality application, augmented reality application, or specialty media application for panoramic video.

Typically, the application could (at least in theory) generate screen projections from full-frame flat projections as input. That is, the application can accept an input flat projection for an entire picture. For the application to be able operate on less powerful hardware, however, the platform can provide a re-projected version of the input flat projection in which irrelevant details are cropped away. Or, the re-projected version of the flat projection can have the same size as the original flat projection, but include additional sample values for better resolution of relevant parts. Thus, in some example implementations, re-projection can improve application performance because the new flat projection that the application receives (1) can be smaller (due to cropping); and/or (2) can include more sample values for relevant parts of the picture, which can make screen projection by the application more accurate. Also, relevant parts of the picture are centered in the new flat projection, which can simplify implementation for the application. The new flat projection can also have the same size from picture to picture, which can further simplify implementation for the application. Finally, re-projection can simplify integration with view-dependent operations, if view-dependent operations are used in application rendering mode.

A. Examples of Re-Projection Between Flat Projections.

FIG. 10 illustrates concepts of re-projection of sample values of an input flat projection to an output flat projection for a picture of panoramic video in application rendering mode. In the example of FIG. 10, for a view section of a spherical projection for a picture of panoramic video, a corresponding section has been identified in an input equirectangular projection (1010). In input equirectangular project (1010), the identified section includes bounding boxes (1024a, 1024b) around corresponding portions (1021a, 1021b). An x indicates the center of the view direction for the identified section in the input equirectangular projection (1010).

The input equirectangular projection (1010) is mapped to a spherical projection (1050), which includes the view section (1051) corresponding to the identified section of the input equirectangular projection (1010). For the center location (x), coordinates (e.g., Cartesian x, y, z coordinates or polar coordinates) are found in the spherical projection (1050).

In FIG. 10, the view section (1051) is located towards the top of the spherical projection (1050), which is consistent with the extensive horizontal stretching shown for the corresponding portions (1021a, 1021b) in the input equirectangular projection (1010). As a result of the horizontal stretching, the identified section in the input equirectangular projection (1010) includes a relatively large number of sample values. Also, the identified section is split into two bounding boxes.

The spherical projection (1050) is rotated so that the center location (x) for the view direction will correspond to a center location of an output flat projection. That is, the spherical projection is rotated so that the center location (x) is rotated to new Cartesian x', y', z' coordinates at a default location such as (0, 0, 0) in the spherical projection (1050), or rotated to new polar coordinates ($\varphi$, $\theta$) at a default location such as heading of 0 degrees and pitch of 0 degrees in the spherical projection (1050).

After rotation, the spherical projection (1050) is mapped to an intermediate equirectangular projection (1070) for the entire picture. In the intermediate equirectangular projection (1070), the identified section is centered. That is, the center location (x) for the view direction is at the middle of the intermediate equirectangular projection (1070). The identified section includes a bounding box (1074) around the corresponding portion (1071) for the view section (1051) after rotation. At this point, the intermediate equirectangular projection (1070) could be provided to the application for rendering of one or more screen projections.

Compared to the identified section in the input equirectangular projection (1010), the identified section in the intermediate equirectangular projection (1070) includes fewer sample values. Also, the sample values are enclosed in a single bounding box. This reduces resource requirements for the application if the identified section of the intermediate equirectangular projection (1070) (e.g., after cropping) is provided to the application.

Optionally, the intermediate equirectangular projection (1070) may be scaled (as shown in FIG. 10) and/or cropped (not shown in FIG. 10) to yield an output equirectangular projection (1080), which may be provided to the application. In the output equirectangular projection (1080), the identified section includes a bounding box (1084) around the scaled corresponding portion (1081) for the view section (1051).

Compared to the identified section in the intermediate equirectangular projection (1070), the identified section in the output equirectangular projection (1080) includes more sample values. Although this may increase resource requirements for the application if the output equirectangular projection (1080) is provided to the application, the application is provided with more sample values for rendering.

Thus, after re-projection, the view direction is the center of the equirectangular projection. So long as the field of view does not change, the size of the bounding rectangle may be unchanged. Or, with scaling, the size of the bounding rectangle can remain the same even if the field of view changes due to zooming in or zooming out.

In practice, intermediate mapping to the spherical projection and rotation can be skipped. For example, for locations of the output flat projection, a mapper determines corresponding locations in an input flat projection, and assigns sample values (by copying or interpolation) from the respective locations in the input flat projection. FIGS. 11a and 11b show examples of re-projection of sample values of an input flat projection to an output flat projection for a picture of panoramic video in application rendering mode, without intermediate mapping to a spherical projection.

In FIG. 11a, for a view section in a view direction, the input equirectangular projection (1110) includes an identified section with corresponding portions (1111a, 1111b) surrounded by bounding boxes (1114a, 1114b). The center location (x) for the view direction is shown. Without intermediate mapping to a spherical projection or rotation of a spherical projection, certain sample values of the input equirectangular projection (1110) are re-projected to an output equirectangular projection (1120). In the output equirectangular projection (1120), the identified section includes a corresponding portion (1121) surrounded by a bounding box (1124). For example, for the respective locations in the bounding box (1124) in the output equirectangular projection (1120), corresponding locations in the identified section in the input equirectangular projection (1110) are determined, and sample values from the corresponding locations are assigned (e.g., by retrieving the sample values or by interpolation). Compared to the identified section in the input equirectangular projection (1110), the identified section in the output equirectangular projection (1120) includes fewer sample values and has a single bounding box. Thus, re-projection can reduce resource requirements for the application if the identified section of the output equirectangular projection (1120) is provided to the application.

In FIG. 11b, as in FIG. 11a, for a view section in a view direction, the input equirectangular projection (1110) includes an identified section with corresponding portions (1111a, 1111b) surrounded by bounding boxes (1114a, 1114b). The center location (x) for the view direction is shown. Without intermediate mapping to a spherical projection or rotation of a spherical projection, certain sample values of the input equirectangular projection (1110) are re-projected to an output equirectangular projection (1130) and scaled. In the output equirectangular projection (1130), the identified section includes a scaled corresponding portion (1131) surrounded by a bounding box (1134). For example, for the respective locations in the bounding box (1134) in the output equirectangular projection (1130), corresponding locations in the identified section in the input equirectangular projection (1110) are determined, and sample values from the corresponding locations are assigned (e.g., by retrieving the sample values or by interpolation).

B. Example Re-Projection Architectures.

Figure 12:
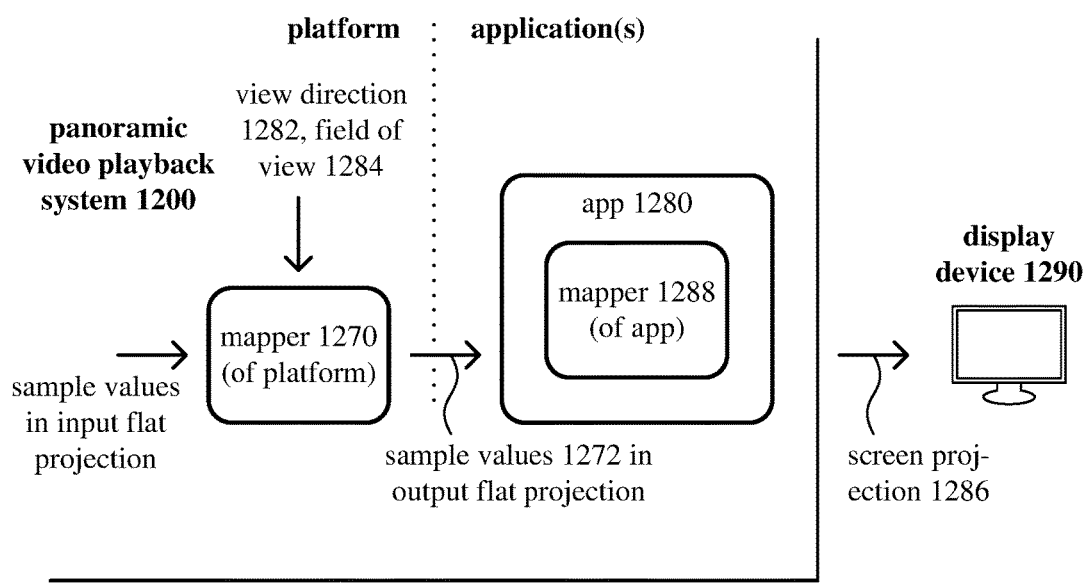
FIG. 12 is a diagram illustrating features of an example architecture for a panoramic video playback system that operates in application rendering mode.

FIG. 12 shows features of an example architecture for a panoramic video playback system that operates in application rendering mode. The example architecture can be a variation of the architecture described with reference to FIG. 6, which supports view-dependent operations. Alternatively, the example architecture of FIG. 12 can be used in a system without support for view-dependent operations.

In FIG. 12, a panoramic video playback system (1200) includes a mapper (1270). The mapper (1270) is a system-provided module. That is, the mapper (1270) is part of a platform that supports application rendering of panoramic video. The mapper (1270) is configured to map at least some sample values (e.g., color-converted sample values provided by a color converter, or sample values provided by a decoder) to sample values (1272) of an output flat projection. In particular, the mapper (1270) is configured to re-project sample values in an input flat projection towards a center location for a view direction (1282) for the application (1280). The mapper (1270) can accept, as input, the view direction (1282) for the application (1280).

For example, for locations in the output flat projection, the mapper (1270) is configured to determine corresponding locations in the input flat projection. The locations in the output flat projection and the corresponding locations in the input flat projection are associated with locations in a view section of an intermediate, spherical projection. The view section of the intermediate, spherical projection is indicated by the view direction (1282). The mapper (1270) is configured to assign sample values to the locations in the output flat projection based on sample values at the corresponding locations in the input flat projection, respectively, and provide the output flat projection to the application (1280). To assign sample values to the locations in the output flat projection without mapping to the intermediate, spherical projection, the mapper (1270) can be configured to select sample values and/or interpolate (e.g., using bilinear interpolation) between sample values at the corresponding locations in the input flat projection, respectively. Alternatively, in order to determine the corresponding locations and assign sample values, the mapper can be configured to project sample values in the input flat projection to the view section of the intermediate, spherical projection, and then project the sample values from the view section of the intermediate, spherical projection to the output flat projection. The identified section can scaled to produce the output flat projection.

The panoramic video playback system can include a color converter, which is configured to convert sample values, produced by the video decoder, from a first color space to a second color space. In this case, the mapper (1270) is configured to map color-converted sample values to the output flat projection. For locations in the output flat projection, the mapper (1270) can be configured to determine corresponding locations in the input flat projection. The locations in the output flat projection and the corresponding locations in the input flat projection are associated with locations in a view section of an intermediate, spherical projection. The view section of the intermediate, spherical projection is indicated by the view direction (1282). The mapper (1270) is further configured to assign sample values to the locations in the output flat projection based on the color-converted sample values at the corresponding locations in the input flat projection, respectively, and provide the output flat projection to the application (1280). To assign sample values to the locations in the output flat projection without mapping to the intermediate, spherical projection, the mapper (1270) can be configured to select color-converted sample values and/or interpolate between color-converted sample values at the corresponding locations in the input flat projection. Alternatively, in order to determine the corresponding locations and assign sample values, the mapper can be configured to project color-converted sample values from the input flat projection to the view section of the intermediate, spherical projection, and then project the color-converted sample values from the view section of the intermediate, spherical projection to the output flat projection.

The mapper (1270) can be configured to identify, depending on the view direction (1282) for the application (1280), a section in the input flat projection. The mapper (1270) can also accept, as input, the field of view (1284) for the application (1280). In this case, the mapper (1270) can be configured to identify, depending on the view direction (1282) and the field of view (1284) for the application (1280), a section in the input flat projection. The identified section in the input flat projection can be a contiguous portion of the input flat projection or multiple non-contiguous portions that wrap around an edge of the input flat projection.

In some example implementations, the mapper (1270) is configured to re-project sample values in the input flat projection so that the output flat projection is exactly centered at the center location for the view direction. Alternatively, the output flat projection can be approximately centered at the center location for the view direction. The input flat projection and the output flat projection can have the same size. Or, the input flat projection and the output flat projection can have different sizes. In particular, the mapper (1270) can be configured to scale a section of the input flat projection to fill the output flat projection, or at least substantially fill the output flat projection, with a buffer area filling remaining boundary areas. Thus, the output flat projection can correspond to one section of the input flat projection, and portions of the input flat projection outside the section can be cropped away in the output flat projection.

With reference to FIG. 12, the panoramic video playback system (1200) further includes the application (1280), which may be provided by a third party. The application (1280) includes a second mapper (1288), which is configured to map at least some of the sample values (1272) from the output flat projection to a screen projection (1286), which is rendered for display on a display device (1290).

Other modules of the panoramic video playback system (1200) can include a streaming controller, input buffer, and video decoder, which operate as described with reference to FIG. 6. In some example implementations, the panoramic video playback system (1200) also includes a view-dependent operation controller, which operates as described with reference to FIG. 6.

C. Example Operations for Re-Projecting Between Flat Projections.

Figure 13:
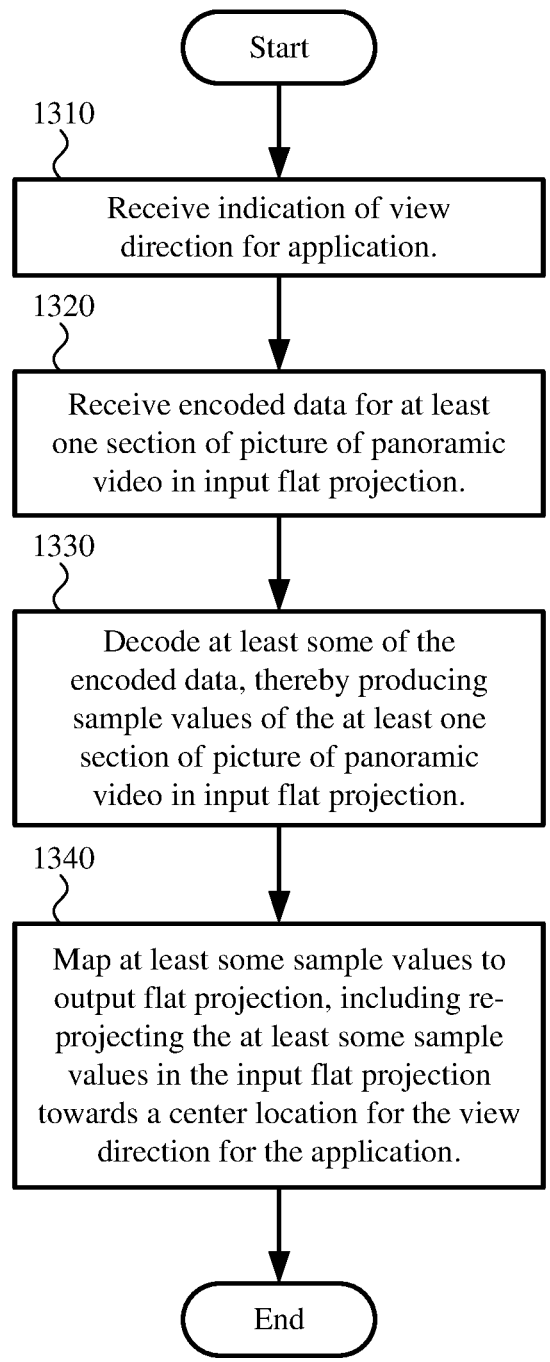
FIG. 13 is a flowchart illustrating a generalized technique for re-projection of sample values of an input flat projection to an output flat projection in application rendering mode during playback of a picture of panoramic video.

FIG. 13 shows a generalized technique (1300) for re-projection of sample values of an input flat projection to an output flat projection in application rendering mode during playback of a picture of panoramic video. A panoramic video playback system such as the panoramic video playback system (1200) shown in FIG. 12 or other panoramic video playback system performs the technique (1300).

The panoramic video playback system receives (1310) an indication of a view direction for an application. The indication of the view direction can be received as described with reference to FIG. 6 or received in some other way.

The panoramic video playback system receives (1320) encoded data for at least one section of a picture of panoramic video in an input flat projection. For example, the input flat projection can be an input equirectangular projection or input cubemap projection. The encoded data can be received as described with reference to FIG. 6 or received in some other way.

The panoramic video playback system decodes (1330) at least some of the encoded data. This produces sample values of the at least one section of the picture of panoramic video in the input flat projection. The encoded data can be decoded as described with reference to FIG. 6 or decoded in some other way.

The panoramic video playback system maps (1340) at least some of the sample values from the input flat projection to an output flat projection. For example, the output flat projection can be output equirectangular projection or an output cubemap projection. As part of the mapping, the panoramic video playback system re-projects sample values of the input flat projection towards a center location for the view direction for the application. Sample values of the input flat projection can be re-projected to the output flat projection as described with reference to FIGS. 11a, 11b and 14, as described with reference to FIG. 10, or in some other way.

The panoramic video playback system can repeat the technique (1300) shown in FIG. 13 on a picture-by-picture basis.

D. Example Implementations for Re-Projecting Between Equirectangular Projections.

In some example implementations, to re-project relevant parts of an input equirectangular projection to an output equirectangular projection, for each location in the output equirectangular projection, a corresponding location in the input equirectangular projection is identified. A sample value is then assigned to the location in the output equirectangular projection based on the sample value at the corresponding location in the input equirectangular projection or interpolation between sample values at neighboring locations in the input equirectangular projection.

Figure 14:
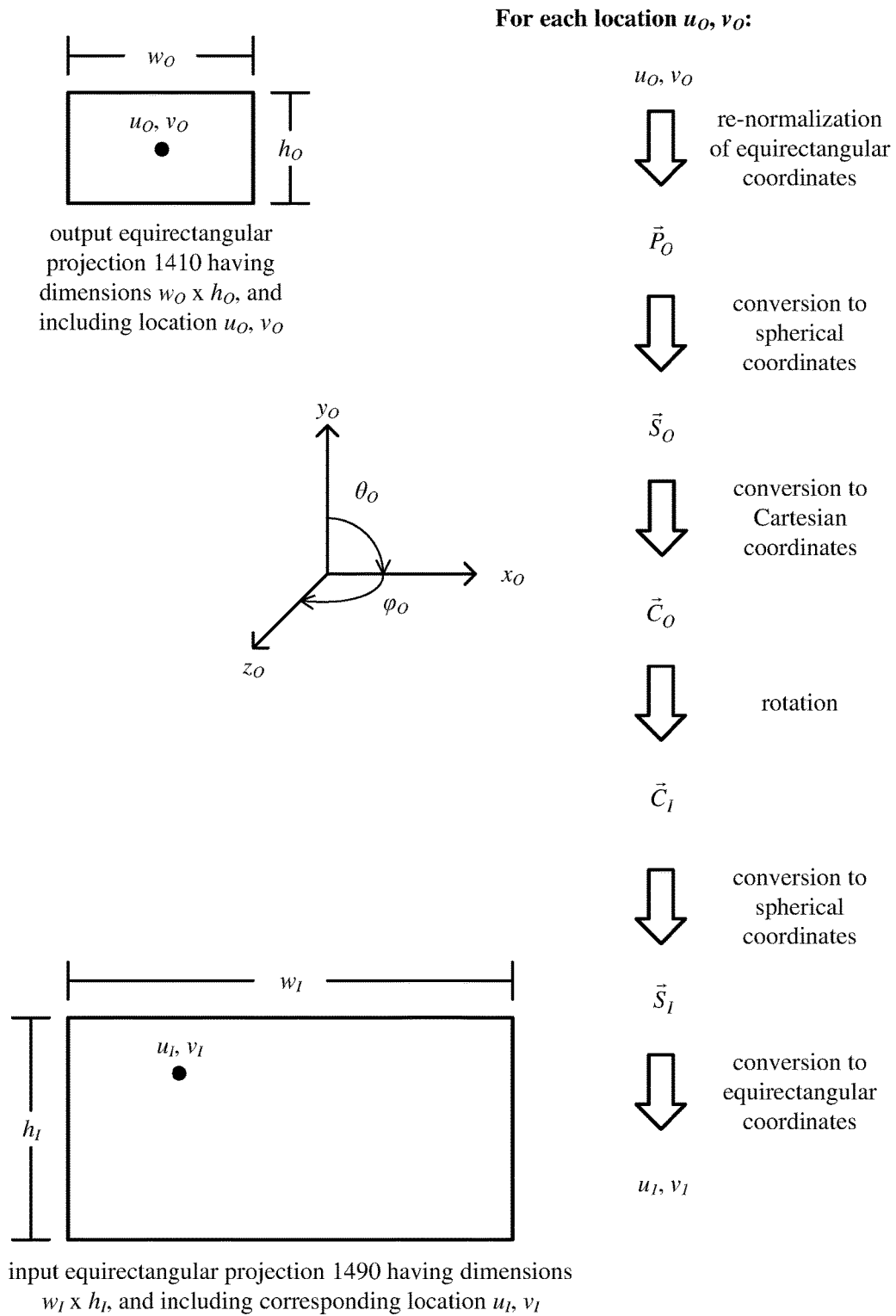
FIG. 14 is a diagram illustrating features of an example implementation for re-projection of sample values of an input flat projection to an output flat projection in application rendering mode during playback of a picture of panoramic video.

FIG. 14 shows an output equirectangular projection (1410), which has a width of $w_O$ sample values and a height of $h_O$ sample values. A point of the output equirectangular projection (1410) is labeled $u_O$, $v_O$. For the sake of illustration, the point $u_O$, $v_O$ in the output equirectangular projection (1410) is the center point of the view direction, but re-projection operations are similarly performed for other locations in the output equirectangular projection (1410).

The width $w_O$ depends on the field of view (FOV), which is measured in radians. For example, the width $w_O$ is set to be:

$$w_O = \frac{\sin(FOV/2)/\cos(FOV/2)}{2}.$$

For the example shown in FIG. 14, the height $h_O$ depends on the width $w_O$. For example, the height $h_O$ is set to be: $h_O = w_O/\pi$.

FIG. 14 also shows an input equirectangular projection (1490), which has a width of $w_I$ sample values and a height of $h_I$ sample values. The dimensions $w_I$ and $h_I$ of the input equirectangular projection (1490) can be 2160×1080 sample values, 4320×2160 sample values, 7680×3840 sample values, 8640×4320 sample values, or some other number of sample values per picture. The input equirectangular projection includes a location labeled $u_I$, $v_I$, which corresponds the labeled location $u_O$, $v_O$ of the output equirectangular projection (1410). For the sake of illustration, the location $u_I$, $v_I$ in the input equirectangular projection (1490) is the center location of the view direction, but re-projection operations are similarly performed to determine corresponding locations in the input equirectangular projection (1490) for other locations of the output equirectangular projection (1410).

For the location $u_O$, $v_O$ in the output equirectangular projection (1410), a mapper re-normalizes the location. The location $u_O$, $v_O$ is initially a relative value in equirectangular coordinates, with each component in the range of 0 . . . 1.0. The vector $\vec{P}_O$ represents the location after re-normalization, and is computed as:

$$\vec{P}_O = 2 \times (\langle u_O, v_O \rangle - 0.5)^\circ \langle w_O, h_O \rangle,$$

where $^\circ$ indicates element-wise multiplication, the subtraction of 0.5 is performed for each element, and the multiplication by a factor of 2 is performed for each element.

Next, the re-normalized location $\vec{P}_O$ is converted to spherical coordinates. The vector $\vec{S}_O$ represents the location after conversion to spherical coordinates, and is computed as:

$$\vec{S}_O = \pi \times \frac{\vec{P}_O + 1}{2} + \langle 0, \pi/2 \rangle,$$

where the multiplication by a factor of $\pi$ is performed for each element, and the addition of $\langle 0, \pi/2, \rangle$ is performed element-wise. At this point, the location $\vec{P}_O$ in re-normalized equirectangular coordinates is represented as the location $\vec{S}_O$ in spherical coordinates $\langle r, \varphi_O, \theta_O \rangle$, where r is understood to be 1 and is omitted from many later calculations.

Next, the location $\vec{S}_O$ in spherical coordinates is converted to Cartesian coordinates. The vector $\vec{C}_O$ represents the location after conversion to Cartesian coordinates, and is computed as:

$$\vec{C}_O = sph2cart(\vec{S}_O)^\circ \langle 1,1,-1,1 \rangle,$$

where $^\circ$ indicates element-wise multiplication, and the function sph2cart( ) is defined as:

$$sph2cart(\langle \varphi_O, \theta_O \rangle) =$$
$$\langle \cos(\varphi_O) \times \sin(\theta_O),$$
$$\cos(\theta_O),$$
$$\sin(\varphi_O) \times \sin(\theta_O),$$
$$1 \rangle.$$

At this point, the location $\vec{S}_O$ in spherical coordinates $\langle r, \varphi_O, \theta_O \rangle$ is represented as the location $\vec{C}_O$ in Cartesian coordinates $\langle x_O, y_O, z_O, w_O \rangle$, where $x_O = \cos(\varphi_O) \times \sin(\theta_O)$, $y_O = \cos(\theta_O)$, $z_O = \sin(\varphi_O) \times \sin(\theta_O)$, and $w_O = 1$.

Next, the location $\vec{C}_O$ in Cartesian coordinates is rotated depending on the view direction. The matrix $M_L$ is a 4×4 affine matrix for a view direction, which can specify a spatial rotation in three dimensions using Euler angles or quaternion units. The matrix $M_L$ can be calculated for a view direction (e.g., from heading, pitch, and roll values) specified for an application. The rotation of the location $\vec{C}_O$ yields a rotated location $\vec{C}_I$ in Cartesian coordinates:

$$\vec{C}_I = \vec{C}_I \cdot M_L^{-1},$$

where · indicates a matrix multiplication. At this point, the rotated location $\vec{C}_I$ in Cartesian coordinates includes components $\langle x_I, y_I, z_I, w_I \rangle$, where $\langle x_I, y_I, z_I \rangle = L^{-1} \langle x_O, y_O, z_O \rangle$, and $w_I$ is still 1.

Next, the rotated location $\vec{C}_I$ in Cartesian coordinates is converted back to spherical coordinates. The vector $\vec{S}_I$ represents the location after conversion back to spherical coordinates, and is computed as:

$$\vec{S}_I = cart2sph(\vec{C}_I),$$

where the function cart2sph( ) is defined as:

$$cart2sph(\langle x_I, y_I, z_I, w_I\rangle) = \left(\sqrt{x_I^2 + y_I^2 + z_I^2},\right.$$
$$\cos^{-1}\left(\frac{y}{\sqrt{x_I^2 + y_I^2 + z_I^2}}\right),$$
$$\left.\tan^{-1}\left(\frac{z_I}{x_I}\right)\right).$$

Thus, the location $\vec{C}_I$ in Cartesian coordinates is represented as the location $\vec{S}_I$ in spherical coordinates $\langle r, \varphi_I, \theta_I\rangle$, where $r=\sqrt{x_I^2+y_I^2+z_I^2}$, $\varphi_I=\cos^{-1}(y/\sqrt{x_I^2+y_I^2+z_I^2})$, and $\theta=\tan^{-1}(z_I/x_I)$.

Finally, the location $\vec{S}_I$ in spherical coordinates $\langle r, \varphi_I, \theta_I\rangle$ is converted back to equirectangular coordinates for the location $u_I$, $v_I$ in the input equirectangular projection (1490), as follows:

$$u_I = 1 - \varphi_I/2\pi, \text{ and}$$

$$v_I = \theta_I/\pi.$$

A sample value is then assigned to the location $u_O$, $v_O$ in the output equirectangular projection (1410) based on the sample value at the corresponding location to, $v_I$ in the input equirectangular projection (1490). Or, if the corresponding location $u_I$, $v_I$ in the input equirectangular projection (1490) is at a fractional position, a sample value is interpolated between locations that neighbor the corresponding location $u_I$, $v_I$ in the input equirectangular projection (1490) (e.g., using bilinear interpolation between the four closest sample values) and assigned to the location $u_O$, $v_O$ in the output equirectangular projection (1410).

Corresponding locations in the input equirectangular projection (1490) can be calculated, and sample values assigned (by retrieving sample values from corresponding locations or interpolation), in parallel for different locations in the output equirectangular projection (1410). For example, such calculations can be implemented with shader instructions in a GPU.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements a panoramic video rendering engine that provides panoramic video rendering services to an arbitrary external application through an interface, wherein the memory comprises computer-executable instructions for implementing: an input projection buffer configured to store at least some sample values of a picture of panoramic video in an input projection; a controller configured to: receive, from the arbitrary external application through the interface, a first indication of a view direction for the arbitrary external application or indication of a view direction source; and based at least in part on the first indication of a view direction or a second indication of a view direction received from the view direction source, identify a section of the picture of panoramic video in the input projection; and a mapper configured to map at least some of sample values of the section of the picture of panoramic video in the input projection to a screen projection based on the identified section in the input projection and output the screen projection to a screen projection buffer for the arbitrary external application, the mapper configured to perform operations to: for locations in the screen projection, determine corresponding locations in the input projection, wherein the locations in the screen projection and the corresponding locations in the input projection are associated with locations in a view section of an intermediate, spherical projection, the view section of the intermediate, spherical projection being indicated by the view direction; and assign sample values to the locations in the screen projection based on the at least some of the sample values from the input projection at the corresponding locations, respectively, in the input projection.

2. The computer system of claim 1, wherein the arbitrary external application does not re-project the screen projection.

3. The computer system of claim 1, wherein the controller is further configured to:
receive, from the arbitrary external application through the interface, an indication of a field of view.

4. The computer system of claim 1, wherein receiving through an interface the first indication of a view direction for the arbitrary external application comprises receiving at least one value specifying an attribute of the view direction.

5. The computer system of claim 1, wherein the view direction source comprises a hardware sensor.

6. The computer system of claim 5, wherein the controller is further configured to receive the second indication of a view direction from the hardware sensor.

7. The computer system of claim 1, wherein the controller is further configured to:
receive, through the interface, an indication that the mapper should provide the screen projection to the screen projection buffer.

8. The computer system of claim 1, wherein the controller is further configured to:
provide, through the interface, an indication of a frame format of the panoramic video.

9. The computer system of claim 1, wherein the controller is further configured to:
receive, through the interface, an updated view direction.

10. The computer system of claim 1, wherein the controller is a view-dependent operation controller, and the computer system further comprises:
a streaming controller configured to request encoded data for at least one section of the picture of panoramic video in the input projection;
an input buffer configured to store the encoded data;
a video decoder configured to decode at least some of the encoded data, thereby producing sample values of the at least one section of the picture of panoramic video in the input projection; and
a color converter configured to convert at least some of the sample values produced by the video decoder from a first color space to a second color space, wherein the input projection buffer stores the color-converted sample values for mapping by the mapper.

11. The computer system of claim 1, wherein the controller is further configured to:

receive, from the arbitrary external application through the interface, a pointer to the screen projection buffer; or pass, to the arbitrary external application through the interface, a pointer to the screen projection buffer.

12. The computer system of claim 1, wherein the controller is further configured to:

receive, through the interface, parameters for a display device on which the screen projection will be displayed; and cause the mapper to format the screen projection for the display device.

13. The computer system of claim 1, wherein the controller is further configured to:

receive an indication of a field of view for the arbitrary external application through the interface; and to identify the section of the picture of panoramic video in the input projection:

use the view direction and the field of view to identify a view section of a spherical projection; and determine one or more portions of the picture of panoramic video in the input projection that correspond to the view section in the spherical projection.

14. The computer system of claim 13, wherein the controller is further configured to:

receive, through the interface, information regarding a display device on which the screen projection will be displayed, wherein the screen projection is formatted for the display device.

15. The computer system of claim 1, wherein: the input projection is an equirectangular projection or cubemap projection.

16. The computer system of claim 1, wherein, to assign sample values to the locations in the screen projection, the mapper is configured to select sample values and/or interpolate between sample values among the at least some of the sample values at the corresponding locations, respectively, in the input projection.

17. The computer system of claim 1, wherein, in order to determine the corresponding locations and assign sample values, the mapper is configured to: project the at least some of the sample values from the input projection to the view section of the intermediate, spherical projection; and project the at least some of the sample values from the view section of the intermediate, spherical projection to the screen projection.

18. In a computer system, a method comprising: sending, through an interface, an indication of a first view direction for an arbitrary external application or indication of a view direction source for the arbitrary external application to a panoramic video rendering engine implementing platform rendering services; and receiving, from the panoramic video rendering engine implementing platform rendering services, in a buffer for the arbitrary external application, a screen projection of locations of a picture of panoramic video in an input projection, the locations corresponding to the first view direction or a second view direction received from the view direction source, the locations of the picture of panoramic video having been mapped to the screen projection by the panoramic video rendering engine, the mapping comprising: for locations in the screen projection, determining corresponding locations in the input projection, wherein the locations in the screen projection and the corresponding locations in the input projection are associated with locations in a view section of an intermediate, spherical projection, the view section of the intermediate, spherical projection being indicated by the first view direction or the second view direction; and assigning sample values to the locations in the screen projection based on the at least some of the sample values from the input projection at the corresponding locations, respectively, in the input projection.

19. The method of claim 18, further comprising:

sending, through the interface, an indication of a field of view for the application;

wherein the screen projection is of locations of the picture of panoramic video in the input projection corresponding to the view direction and field of view.

20. One or more tangible computer-readable media storing computer-executable instructions for causing a computer system, when programmed thereby, to perform operations for providing platform video rendering services to an arbitrary external application through an interface, the operations comprising: receiving from the arbitrary external application, through a call to the interface, a first indication of a view direction for the arbitrary external application or an indication of a view direction source; based at least in part on the first indication of the view direction or a second indication of the view direction received from the view direction source, identifying at least a first section of a picture of panoramic video in a first input projection; mapping at least some of sample values of the at least a section of the picture of panoramic video in the first input projection to a first screen projection, the mapping comprising: for locations in the first screen projection, determining corresponding locations in the first input projection, wherein the locations in the first screen projection and the corresponding locations in the first input projection are associated with locations in a view section of an intermediate, spherical projection, the view section of the intermediate, spherical projection being indicated by the first indication of the view direction or the second indication of the view direction; and assigning sample values to the locations in the first screen projection based on the at least some of the sample values from the first input projection at the corresponding locations, respectively, in the first input projection; outputting the first screen projection for display to a buffer for the arbitrary external application; based at least in part on a third indication of the view direction, the third indication of the view direction being received from the arbitrary external application or the view direction source, identifying at least a second section of a picture of panoramic video in a second input projection, which can be the first input projection; mapping at least some of sample values of the at least a section of the picture of panoramic video in the second input projection to a second screen projection; and outputting the second screen projection for display to the buffer for the arbitrary external application.

* * * * *